United States Patent
Grenader

(10) Patent No.: US 10,481,948 B2
(45) Date of Patent: Nov. 19, 2019

(54) DATA TRANSFER IN A COLLABORATIVE FILE SHARING SYSTEM

(71) Applicant: Box, Inc., Redwood City, CA (US)

(72) Inventor: Denis Grenader, Sunnyvale, CA (US)

(73) Assignee: Box, Inc., Redwood City, CA (US)

( * ) Notice: Subject to any disclaimer, the term of this patent is extended or adjusted under 35 U.S.C. 154(b) by 623 days.

(21) Appl. No.: 14/835,599

(22) Filed: Aug. 25, 2015

(65) Prior Publication Data

US 2017/0063965 A1 Mar. 2, 2017

(51) Int. Cl.
- *G06F 9/48* (2006.01)
- *H04L 29/08* (2006.01)
- *G06F 11/00* (2006.01)

(52) U.S. Cl.
CPC ............ *G06F 9/4881* (2013.01); *G06F 11/00* (2013.01); *H04L 67/1095* (2013.01); *H04L 67/22* (2013.01); *H04L 67/2842* (2013.01); *H04L 67/02* (2013.01)

(58) Field of Classification Search
CPC .... G06F 9/4881; G06F 11/00; H04L 67/1095; H04L 67/22; H04L 67/2842; H04L 67/02
See application file for complete search history.

(56) References Cited

U.S. PATENT DOCUMENTS

| | | | | | |
|---|---|---|---|---|---|
| 5,822,527 | A | * | 10/1998 | Post | G06Q 10/107 709/206 |
| 9,363,282 | B1 | * | 6/2016 | Yu | H04L 63/1425 |
| 9,858,322 | B2 | * | 1/2018 | Theimer | G06F 17/30563 |
| 10,121,141 | B1 | * | 11/2018 | Belleville | G06Q 20/3672 |
| 2002/0107997 | A1 | * | 8/2002 | Anderson | G06F 9/465 719/316 |
| 2015/0207897 | A1 | * | 7/2015 | Flack | H04L 67/2842 709/213 |
| 2016/0117185 | A1 | * | 4/2016 | Fang | G06F 9/45558 718/1 |
| 2016/0261727 | A1 | * | 9/2016 | Yang | H04L 65/4069 |
| 2016/0321308 | A1 | * | 11/2016 | Brinnand | G06F 17/30303 |
| 2016/0323376 | A1 | * | 11/2016 | Shanley | H04L 67/1061 |
| 2016/0337465 | A1 | * | 11/2016 | Tarre | H04L 67/2823 |
| 2016/0357778 | A1 | * | 12/2016 | MacKenzie | G06F 13/36 |

* cited by examiner

*Primary Examiner* — Todd L Barker

(74) *Attorney, Agent, or Firm* — Sheridan Ross P.C.

(57) ABSTRACT

A system and method for facilitating implementing a computing task (such as selectively transforming and/or writing data retrieved from a message stream of a message broker) via concurrent computing in a networked computing environment. The example method includes using a distributed software framework to encapsulate overhead functionality for facilitating extracting data from a data stream output from the message broker and writing associated data to one or more targets in a networked computing environment; and accommodating custom code as a plugin to one or more modules of the software framework. In a more specific embodiment, the one or more modules include one or more committers. The overhead functionality includes functionality for facilitating selective redistribution of work when a process becomes unreliable; tracking of offsets for message batches in the data stream; automatically assigning work to nodes in the networked computing environment.

20 Claims, 11 Drawing Sheets

DATA TRANSFER IN A COLLABORATIVE FILE SHARING SYSTEM

CROSS REFERENCES TO RELATED APPLICATIONS

This application is related to U.S. patent application Ser. No. 13/937,060, entitled SYSTEM AND METHOD FOR PERFORMING SHARD MIGRATION TO SUPPORT FUNCTIONS OF A CLOUD-BASED SERVICE, filed on Jul. 8, 2013, which is hereby incorporated by reference as if set forth in full in this application for all purposes.

This application is related to the following co-pending U.S. patent application Ser. No. 14/835,606 entitled DATA CACHING IN A COLLABORATIVE FILE SHARING SYSTEM, filed on Aug. 25, 2015, which is hereby incorporated by reference as if set forth in full in this application for all purposes.

BACKGROUND

The present application relates to computing and more specifically to software and associated systems and methods for facilitating selectively retrieving and storing and/or processing data in a networked computing environment using concurrent computing processes.

Software for facilitating retrieving or intercepting data and then processing the data is employed in various demanding applications, including big data computing applications, MapReduce jobs for enterprise cloud services, and so on. Such applications often demand efficient mechanisms for enabling selective extraction of data from among plural computing resources and/or data streams of a network, and for processing or handling the extracted data without requiring lengthy, error prone, and costly software development efforts.

Efficient and reliable mechanisms for retrieving or collecting data and enabling selectively writing of portions of the collected data to a target network resource (e.g., database, software process, etc.) are particularly important in enterprise applications, which may implement complex suites of distributed software and data storage mechanisms that may be spread among many servers and server clusters. In such enterprise computing environments, efficient coordination of data retrieval, storage, and processing operations among distributed network resources can be critical for efficient performance of enterprise tasks, including extraction of context information required for informing critical business decisions.

To leverage distributed network resources, a given software job or task may be divided into components, which are then distributed to different computing resources to be worked on concurrently and/or in parallel. Concurrent computing in server clusters often involves use of message brokers (e.g., Apache Kafka, also simply called Kafka herein, or other message brokers such as those that can handle real-time data feeds) to collect data from a data stream, event monitor, database, and/or cache; then queue, and/or register the collected data in accordance with a topic and/or task. Operations may be performed on the data. For example, data matching certain criteria may be written to a particular target data store, program, and/or other mechanism.

In general, networked computing environments often lack efficient mechanisms for facilitating consumption of data from message brokers, e.g., Kafka. Existing mechanisms leveraging Kafka streams often require development of custom scripts (e.g., mapper scripts and reducer scripts used for MapReduce jobs) to manage data extraction from Kafka streams; divide work among potentially uniquely configured servers of a server cluster; rebuild functionality in various network locations for various different targets, and so on The required hand-coding of substantial overhead code may complicate implementation of distributed data extraction and processing applications and associated concurrent processes.

SUMMARY

An example method facilitates implementing a computing task (such as selectively transforming and/or writing data retrieved from a message stream of a message broker) via concurrent computing in a networked computing environment. The example method includes using a distributed software framework to encapsulate overhead functionality for facilitating extracting data from a data stream output from the message broker and writing associated data to one or more targets; and accommodating custom code as plugins to one or more modules of the software framework.

In a more specific embodiment, the one or more modules include one or more committer managers. The overhead functionality includes functionality for facilitating selective redistribution of work when a process becomes unreliable; tracking of offsets for message batches in the data stream; automatically assigning work to nodes in the networked computing environment, providing at least once delivery guarantees, and so on.

The specific example method further includes using a replicator worker in communication with one or more fetchers, the one or more fetchers in communication with the one or more committer managers, to receive a portion of a message stream from a message broker; and employing the one or more committer managers to facilitate implementing the computing task, e.g., software action, using the portion of the message stream. The software action may include writing the portion (or modified or transformed version thereof or signal derived therefrom or triggered thereby) of the message stream to a target computing resource, such as a database or other computing process. The message broker that provides the data stream may be an Apache Kafka message broker (also simply called Kafka herein).

The example method may further include selectively incorporating custom code as a plugin to the committer manager, wherein the custom code includes code to transform data of the message stream in advance of facilitating writing resulting transformed data to the target network resource. The data is transformed according to the software action or task to be performed.

The portion of the message stream extracted may include one or more message batches, wherein each message batch includes a sequence of messages and is characterized by a specified length, such as four messages. One or more fetchers selectively cache data from the message stream in accordance with offset values of each message and/or of the offset value of the first message of a given message batch.

In the specific example embodiment, minimum and maximum message offsets for the cache are selectively checked when a request for a message batch with a particular offset arrives at a fetcher from a committer manager. When the requested offset does not match a batch offset key characterizing the cache, then the requested offset is checked to determine if it is within the range of the maximum and minimum message offset values in the cache. If the message batch offset falls within the range, then a portion of the messages in the cache that form part or all of the requested batch are sliced from the cache and delivered to the requesting committer. This facilitates alignment of committer message batch requests, such that a subsequently requested batch will now tend to be within the cache, or otherwise, the requested message batch (if a new batch) will be added to the cache for subsequent use by other requesting committer managers.

The example method further includes employing a process coordinating service, such as an Apache ZooKeeper service, to coordinate communications between and operations of a cluster of servers. The ZooKeeper service includes one or more components that are replicated across each of the servers of the cluster of servers. An Akka toolkit and runtime facilitates orchestrating data flow between software components within an individual server of the cluster of servers. In other embodiments, such a toolkit may not be needed (e.g., the functionality can be provided in other ways) or other toolkits, libraries, utilities, environments, or resources may be utilized, as desired.

The example method further includes incorporating plural replicator workers (at least one replicator worker for two or more servers of the cluster of servers) to facilitate implementing a task indicated via the ZooKeeper service. A replicator leader selectively rebalances portions of the task among the replicator workers. The example replicator leader includes a message broker monitor (e.g., a Kafka monitor) that monitors the message stream output by the message broker (e.g., Kafka) and selectively informs one or more replicator workers as to changes occurring in the message stream.

Another specific example method facilitates distributing log information in a cross-enterprise file collaboration system that includes one or more server computers coupled to one or more client devices, wherein the client devices include a first group of client devices on a first network and a second group of client devices on a second network. The example method may be performed by the one or more server computers.

The example method includes receiving log information from a service that is in communication with a web application in response to an operation of a client device; storing log information in a message broker; using a replicator to fetch at least a portion of the log information from the message broker; and using a committer to write at least a portion of the fetched log information to a target, wherein the log information written to the target is also replicated across two or more data centers.

Hence, certain embodiments discussed herein may act as data transfer or MapReduce agents or frameworks that accommodate plugins to transform data retrieved from a message broker or other data stream before the transformed data is written to a target. By employing the data transfer agent or framework to encapsulate overhead functionality for ensuring high availability and redundancy, work assignment distribution, tracking of message offsets, providing at least once delivery guarantees, and so on, various software tasks to be performed via concurrent computing can be quickly developed (e.g., by developing plugins without the need to hand-code overhead functionality) and can be run reliably and efficiently.

System efficiency is enhanced by employing data caching to cache a portion of a data stream that can be shared among committers that are processing the data stream. Upon system startup, cache alignment is performed using minimum and maximum message batch offsets, such that committer requests for data from the data stream are eventually accessible from the cache.

Accordingly, multiple data streams that may have previously served separate custom MapReduce jobs can now leverage a shared cache to mitigate effects on network bandwidth that may occur when multiple systems consume data directly from Kafka and not from the data transfer framework (also called the Castle framework herein).

A further understanding of the nature and the advantages of particular embodiments disclosed herein may be realized by reference of the remaining portions of the specification and the attached drawings.

DETAILED DESCRIPTION OF EMBODIMENTS

Figure 1:
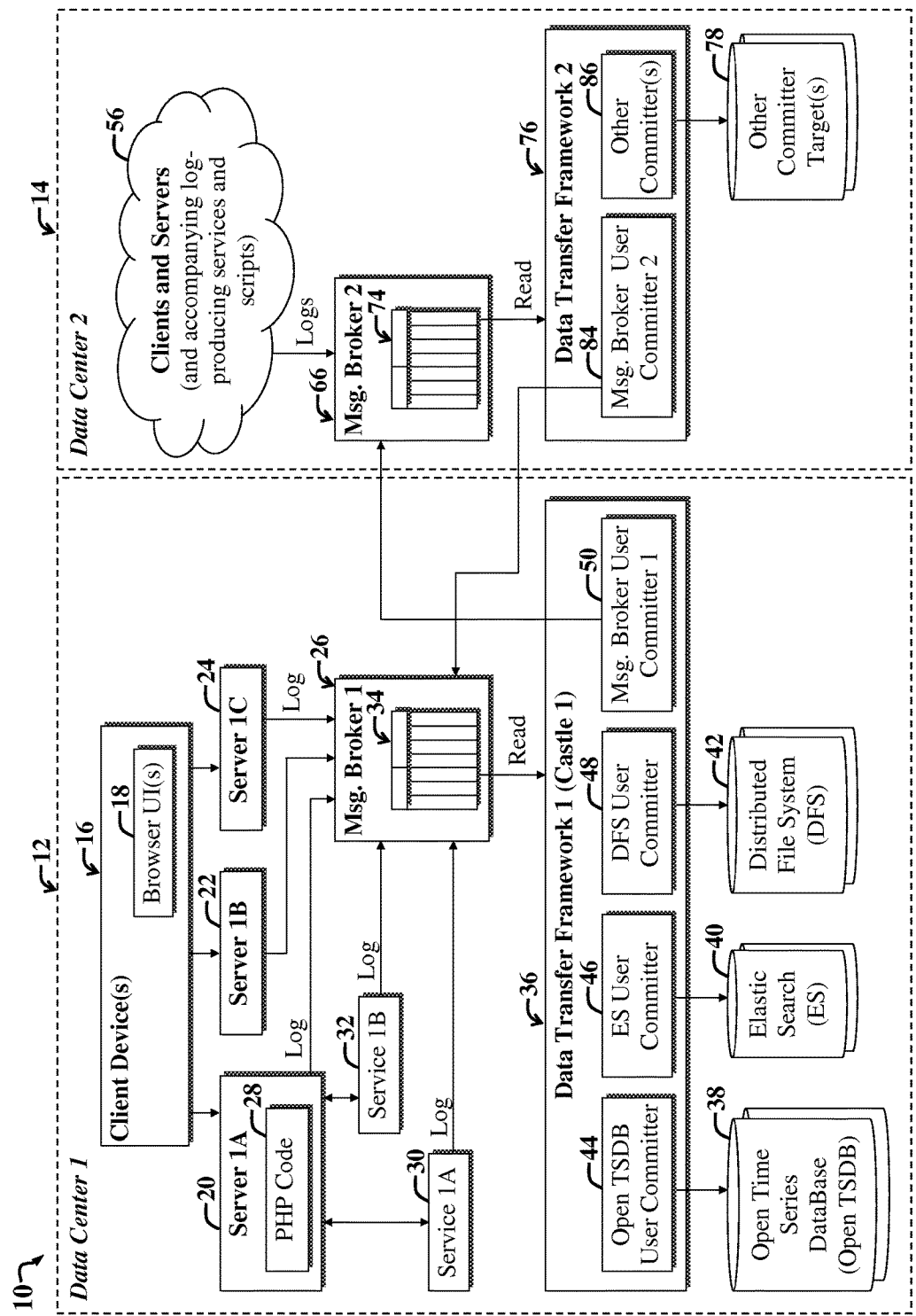
FIG. 1 is a block diagram illustrating a first example system and accompanying enterprise computing environment, which spans a first data center and a second data center, and which employs one or more frameworks for efficiently and reliably reading data from a message stream and selectively writing data to one or more targets using concurrent computing.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for an enterprise. An enterprise may be any organization of persons, such as a business, university, government, military, and so on. The terms "organization" and "enterprise" are employed interchangeably herein.

An example enterprise computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include web services managers, service buses, E-business suites, process managers, notification servers, domain administration software, various types of middleware, including Application Programming Interfaces (APIs), and so on.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices, such as the smart device behavior analysis and control system 128, via the Internet.

For the purposes of the present discussion, a message broker may be any mechanism that collects data (e.g., in the form of one or more messages or streams thereof) from one or more sources in preparation for dispersing collected data or otherwise for making an associate data stream available to one or more other computing devices or components of a computing environment.

Certain concurrent computing applications may employ a message broker, e.g., Kafka, to derive a data stream from servers (and accompanying services and software applications) of a cluster, the data of which can be captured and used by various custom processes and applications. For example, conventionally, custom software may be written to extract data from Kafka and to selectively write extracted data to one or more databases.

However, such custom software often involves substantial additional code for coordinating the data extraction and writing process involving plural servers, server clusters, and data centers; for assigning work or sub-processes to different network computing resources; rebalancing work when one or more resources goes offline; tracking offsets of message batches retrieved from Kafka, and so on. Various embodiments discussed herein mitigate certain problems involved with developing and implementing such additional code.

For clarity, certain well-known components, such as hard drives, processors, operating systems, power supplies, Internet Service Providers (ISPs), class loaders, bytecode compliers, job trackers, task trackers, master nodes, slave nodes, and so on, are not necessarily explicitly called out in the figures. However, those skilled in the art with access to the present teachings will know which components to implement and how to implement them to meet the needs of a given implementation.

FIG. 1 is a block diagram illustrating a first example system 10 and accompanying enterprise computing environment, which spans a first data center 12 and a second data center 14, and which employs one or more data transfer frameworks 36, 76 for efficiently and reliably reading data from a message stream (e.g., from a message broker, such as Kafka 26, 66) and selectively writing data to one or more targets (e.g., targets 38-42, 78) using concurrent computing.

For the purposes of the present discussion, a data transfer framework may be any mechanism or collection of mechanisms that includes computer code for facilitating moving, transforming, and/or processing or transforming data as it is passed between one or more computing devices or components in a computing environment.

Note that, in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For example, note that while certain client devices 16 are shown positioned inside of the first data center 12, that the client devices 16 may be positioned outside of the first data center 12, without departing from the scope of the present teachings. Similarly, client devices of the clients and servers 56 of the second data center 14 may be positioned outside of the second data center 14, without departing from the scope of the present teachings.

Furthermore, while certain hierarchically related modules may be shown as nested (i.e., one module within another) in accordance with the hierarchical relations, alternatively, such hierarchically related modules may be illustrated as intercommunicating modules, e.g., as child nodes coupled to a parent node.

The committer nodes 44-50 of the first data transfer framework 36 (e.g., Castle framework 1) may be further shown as child nodes of one or more parent nodes (e.g., replicator workers, as discussed more fully below) within the first data transfer framework 36, wherein the first data transfer framework 36 represents an ancestor node of the committer nodes, i.e., modules 44-50.

In the example system 10, the first data center 12 accommodates servers 20-24 of a server cluster. For the purposes of the present discussion, a server cluster may be any collection of one or more servers. A data center may be any building or facility housing or accommodating a collection of computing resources, e.g., servers. In the present example embodiment, the first data center 12 and the second data center 14 accommodate one or more server clusters that belong to a first domain and a second domain, respectively.

The first data center 12 accommodates client devices 16 and accompanying graphical User Interfaces (UIs) 18, which may be implemented via browsers. The client devices 16 may communicate with various servers 20-24 via a network, such as the Internet, and the servers 20-24 may be co-located in a data center and governed by an administrative software application as part of a server domain.

The example servers 20-24 include a first server 20 (server 1A), a second server 22 (server 1B), and a third server 24 (server 1C). Note that additional or fewer servers may be employed in practice, without departing from the scope of the present teachings. The example servers 20-24 may be PHP (Hypertext Preprocessor, also known as Personal Home Page) servers, i.e., servers with software support for server-side scripts, including web applications, written using PHP scripting language. The support may include a PHP interpreter, command-line interfaces, and so on.

In the present example embodiment, the first example server 20 is shown including PHP code 28, which may implement a web application that is accessible to the client devices 16 and which further communicates with various services 30, 32, e.g., a first service 30 (service 1A) and a second service 32 (service 1B). For the purposes of the present discussion, a web application may be any computer code, e.g., a software application, which is adapted to be accessed by one or more client devices over a network, such as the Internet or an intranet. A web application may call and/or implement one or more web services.

The services 30, 32 may represent web services. A web service may be any software function or operation activated or implemented via software running on a server in response to a signal, e.g., a request message, sent from a client to the server via a network, such as the World Wide Web. The software that implements a web service operation may also be called a web service, software service, or simply service herein.

Generally, web applications may be implemented via various methods and accompanying mechanisms, such as Java, JavaScript, Flash, Silverlight, and so on. Furthermore, certain web applications may be defined by a process template that executes several processes, where each process is implemented via a separate web service.

Generally, software services provide functionality, e.g., capabilities, that may be reused by different applications or processes (that may be distributed across a network), which access the functionality via a predetermined interface, e.g., as specified via middleware, and consistent with a service description.

For the purposes of the present discussion, software functionality may be any function, capability, or feature, e.g., stored or arranged data, that is provided via computer code, i.e., software. Generally, software functionality may be accessible via use of a UI and accompanying UI controls and features. Software functionality (often simply called functionality herein) may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

As the various servers 20-24 (which may represent a middle tier of the first data center 12) execute web applications and access various services, event logs are collected via event log collection functionality installed on the servers 20-24 and/or incorporated within the services 30, 32. Examples of log collection functionality include Skynet Monitoring, and other server event monitoring software, such as security event loggers, Structured Query Language (SQL) server event loggers, and so on. Note that each service 30, 32 may also include code for reporting on various performance and/or behavior metrics characterizing each service 30, 32.

For the purposes of the present discussion, log information may be any data that is collected as a process, application, and/or service operates and that characterizes the process application, and/or service and/or past behavior thereof.

Log information output by the various servers 20-24 and associated services (e.g., services 30, 32) is forwarded to a first message broker 26, such as Apache Kafka (also simply called Kafka herein). The first message broker 26 (also called Kafka 1) includes a message queue 34 that includes organized log information from the servers 20-24. The organized log information is arranged in the queue 34 by topic, wherein each topic has one or more partitions or sub-streams of data.

For the purposes of the present discussion, a Kafka message broker may be any collection of hardware and/or software and/or associated functionality for collecting data streams, e.g., real time data, from one or more sources, and for selectively outputting the collected data. Certain Kafka message brokers include a queue, such as a First-In-First-Out (FIFO) buffer or register, the queue of which stores message sequences that may be output from the message broker and used by other network resources.

In the present example embodiment, messages output from a Kafka message broker, e.g., output from the first Kafka instance 26, may be arranged in sequences of messages, which include sequences of message batches. Each message batch represents a set of messages that have sequentially numbered offsets. The batch offset refers to the offset of the first message of the batch.

The first data transfer framework 36 (also called Castle 1) may include components distributed across multiple servers, where each server may host one or more committers 44-50. The Castle framework 36 includes software for facilitating overhead tasks (i.e., for providing overhead functionality), such as providing features for High Availability (HA) and process redundancy (e.g., including software for redistributing work allocated to different software components and servers when a given process, service, server, or accompanying application becomes unreliable, e.g., quits operating or otherwise goes offline); tracking of offsets for message batches in a data stream maintained by the first message broker 26 and/or retrieved therefrom; automatically initially assigning work to nodes (e.g., computing resources, such as servers and/or associated applications or computing resources) in the networked computing environment, and so on.

For the purposes of the present discussion, a Castle framework may be any framework that is adapted to act as a data transfer agent between a message broker, such as Kafka, and one or more targets, such as databases and/or applications. A framework may be any software abstraction or methodology for implementing a collection of one or more computing tasks. Certain frameworks include reusable software components and accompanying environments that facilitate development of software applications, such as user committer plugins for implementing concurrent computing tasks, as discussed more fully below.

For the purposes of the present discussion, concurrent computing refers to a computer process that includes subprocesses, which are divided among network resources to be completed within a certain time interval. Concurrent computing represents a subset of parallel processing, to the extent that parallel processes are concurrent processes, but some concurrent processes need not be parallel processes but nevertheless may have overlapping processing intervals that complete at a given time.

In the present example embodiment, the first data transfer framework 36 and a second data transfer framework 76 (which may also be implemented as a Castle framework, called Castle 2) represent distributed software frameworks that encapsulate overhead functionality and that includes code for extracting data from a data stream or queue output from the message broker (e.g., the first Kafka instance 26 and a second Kafka instance 66 running in the second data center 14) and writing associated data or modified or transformed versions thereof to one or more targets (e.g., databases 38-42, 78) in a networked computing environment, e.g., the networked enterprise computing environment corresponding to the overall system 10.

In the present specific example embodiment, the first example data transfer framework 36 includes the various committers 44-50, including a Time Series DataBase (TSDB) committer 44, an Elastic Search (ES) committer 46, a Distributed File System (DFS) (e.g., Hadoop DFS) committer 48, and a first Kafka committer 50.

Similarly, the second data transfer framework 76 running on the second data center 14 includes a second data transfer committer 84 (e.g., Kafka committer) and one or more other committers 86. In the present example embodiment, the committers 44-50, 84, 86 (also called user-provided plugins) represent user committers, which are encapsulated by or otherwise represent children of data transfer framework committer manager nodes (also called Castle committer manager nodes), as discussed more fully below.

The example user committers 44-46, 84, 86 may be implemented as plugins containing custom code, also called user code. The user committers 44-46, including committers 84, 86 of the second Castle framework 76, plug into parent Castle committer managers. The Castle committer managers may in turn represent child nodes of one or more parent fetcher nodes, which in turn represent child nodes of one or more parent replicator nodes, as discussed more fully below.

For the purposes of the present discussion, a hierarchy may be any arrangement of items, e.g., software modules or components, programming language classes and subclasses, data objects, names, values, categories, and so on. The items may be ordered or positioned such that they exhibit superior or subordinate relationships with related items in a data set. A hierarchy may refer to a displayed representation of data items or may refer to data and accompanying relationships existing irrespective of the representation.

A given computing component, e.g., a committer manager, replicator, and so on, is said to be a child node (or simply a child) of a parent node if the parent node encapsulates, includes, or otherwise controls behavior of (e.g., controls starts and stops of) the committer manager, replicator, and so on. Similarly, a child node that has a parent node that is a child of another node is called a descendant (e.g., grandparent) of the other node. Similarly, the other node (grandparent node) may be called an ancestor of the child node.

A node may be any computing resource, e.g., software module or component, server, etc., which includes code for performing one or more particular tasks of the set of tasks. Examples of nodes include the user committers 44-50, 84, 86, which may represent descendant nodes of larger Castle framework nodes 36, 76.

In the present example embodiment, the TSDB user committer 44 includes computer code for employing the first Castle framework 36 to facilitate reading data from the first Kafka instance 26; formatting the retrieved data according to requirements of the target Open TSDB 38; and writing the formatted data to the Open TSDB target 38. The computer code for the TSDB user committer 44 is called custom code or user code, as end users of the Castle framework 36 may write code specifically for the process of collecting Kafka data (or other message broker data), formatting it, and writing it to the TSDB 38. The end users may represent, for example, customers of cloud services that subscribe to one or more cloud services and/or other functionality provided via the first data center 12 and that develop their own plugins for use with Castle frameworks as discussed herein.

Similarly, the ES user committer 46 includes custom user code for selectively retrieving data from the first message broker instance 26; formatting the retrieved data for use by the ES target 40; and writing the formatted data to the ES target 40.

Similarly, the DFS user committer 48 may represent a data transfer framework plugin that includes custom code for selectively retrieving data from the first message broker instance 26; formatting the data for storage in the DFS target 42; and then writing or otherwise transferring the formatted data to the DFS target 42.

Note that in certain implementations, extracting data from the first message broker instance 26 and writing the data to the DFS target 42 may represent a MapReduce job or operation, where data is mapped from the first message broker instance 26 using the first data transfer framework 36, and the mapped data is then reduced by the DFS user committer 48 before it is written to the target DFS 42.

For the purposes of the present discussion, a MapReduce job may be any collection of computer instructions, e.g., code and data, which specifies data to be collected from a database or message broker and computer processing to be applied to the extracted data. The selective extraction of data from the database or file is called mapping, whereas the processing of the extracted data (i.e., mapped data) is called reducing. The process of reducing data may involve applying a function (e.g., filtering, formatting, summing, etc.) to the data. The function may be implemented as a function object.

The first message broker user committer 50 includes code for replicating data maintained by the first message broker instance 26 and associated queue 34 of messages at the second message broker instance 66 running on the second data center 14. In this case, the second message broker instance 66 represents a target of the first message broker user committer 50.

Similarly, the second message broker instance 66, which may receive log information, software behavior metrics, and so on, from clients and servers 56, includes a message queue 74 arranged by topic and partition. A second message broker user committer 84 running on the second data transfer framework 76 includes code for replicating the data maintained at the second message broker instance 66 at the first message broker instance 26. In this case, the first message broker instance 26 represents a target of the second message broker user committer 84. Other user committers 86 of the second data transfer framework 76 include code for writing data from the second message broker instance 66 to one or more targets 78.

By employing different message broker committers 50, 84 to replicate message broker data between both data centers 12, 14, the resulting redundancy facilitates accommodating and handling processes that may be disrupted when one of the data centers 12, 14 goes offline or experiences problems.

Note that while the various user committers 44-50, 84, 86 are called custom committers and may represent customer or user-supplied code, the various committer plugins 44-50, 84, 86 may be provided with (i.e., packaged with) the data transfer frameworks 36, 76 (e.g., Castle frameworks) without departing from the scope of the present teachings. In such cases, users may still wish to construct custom committers. The Castle frameworks 36, 76 facilitate integration of (and/or interfacing of) custom-written committers (i.e., committer plugins) with various network resources of the data centers 12, 14 to ensure HA, redundancy, work assignment and load balancing, tracking of message batch offsets, and so on.

For the purposes of the present discussion, a plugin may be any software component that adds one or more features or functionality to a preexisting software application, such as a browser or other application. The terms add-in, extension, and plugin may be employed interchangeably herein.

In the present example embodiment, the data centers 12, 14 represent enterprise networks, which may include one or more enterprise private networks. An enterprise private network may be any private network used for an enterprise. A private network may be any network that uses a collection of private network addresses to identify computing resources, such as computers coupled to the network. Private network addresses may be selected, for example, in accordance with Request For Comment (RFC) 4193 for Internet Protocol Version 6 (IPv6).

The system 10 may represent a cross-enterprise file collaboration system, wherein targets 38-42 represent files of a first enterprise, and the other committer targets 78 represent files of a second enterprise. Hence, the system 10 and accompanying Castle frameworks 36, 76 facilitate implementing a method for distributing log information or other data in a cross-enterprise file collaboration system.

Hence, such a cross-enterprise file collaboration system 10 includes one or more server computers 20-24, 56 coupled to one or more client devices 16, 56, wherein the client devices 16, 56 include a first group of client devices 16 on a first network (represented by the first data center 12) and a second group of client devices 56 running on a second network (represented by the second data center) 14.

The accompanying method may involve receiving log information from a service (e.g., one or more of the services 30, 32) that communicates with a web application (e.g., the PHP web application 28) in response to an operation of a client device (e.g., one of the client devices 16); storing log information in a message broker (e.g., the Kafka brokers 26, 66); using a replicator (which may be a parent or ancestor of the user committers 44-50, 84, 86) to fetch at least a portion of the log information from the message broker 26, 66; and using a committer 44-50, 84, 86 to write at least a portion of the fetched log information to a target 38-42, 78, wherein the log information written to the target 38-42, 78, is also replicated across two or more data centers 12, 14.

In the present example embodiment, the various targets 38-48, 86, represent databases or data stores. However, committer targets are not limited to databases, search engines, or other data stores. For example, certain committers may consume data from a Kafka message broker; then generate a control signal based on the consumed data. The control signal is then delivered to another software module or component.

Similarly, data transformed by a committer or otherwise filtered and/or passed through the committer may be forwarded to a computing process target, i.e., to another program or process that then uses the retrieved data to perform another function, data analysis, or process. An example target process is a process that receives user login information from a Kafka message broker via a user committer and then analyzes the data to determine if any anomalies occur in the login information to warrant further investigation.

Note that conventionally, data from a Kafka stream (i.e., data output from the message broker instances 26, 66) may be consumed by a distributed enterprise search engine, such as ES; by distributed databases, e.g., Open TSDB, and so on. Alternatively, and/or in addition, custom software, such as custom Map/Reduce jobs may be written by developers to read data from a Kafka stream and then to write the data to a DFS, such as the Hadoop DFS (HDFS). In a Map/Reduce job, a mapper extracts data, and a reducer performs processing on the extracted data. The processing may occur concurrently and/or in parallel among different servers of a network.

Hence, conventionally, efficient mechanisms for facilitating consuming data from a Kafka message broker were lacking. Various custom MapReduce jobs were often constructed, and such jobs often required tedious coding of overhead code, such as code for assigning sub-tasks to different servers, providing redundancy and HA (e.g., in the event that a server host crashes or goes off line), tracking of message offsets, and so on. Furthermore, the code often required rebuilding at different network resources, and data communications between the various MapReduce code, Kafka message broker(s), and the targets often consumed excess network bandwidth.

In certain embodiments discussed herein, such excess consumption of network bandwidth and/or other resources is mitigated in part by employing one or more data transfer framework committer managers (e.g., parents of the user committers 44-50, 84, 86, as discussed more fully below) to selectively cache data from the message broker (e.g., the message broker 26), and then efficiently share the cached data among user committers 44-50, 84, 86.

Furthermore, overhead code need not be rewritten each time data is to be extracted from a message broker and then written to a new target. In such cases, the user leverages overhead functionality provided by the data transfer framework (e.g., the first Castle framework 36 and/or the second Castle framework 76), and simply writes a portion of code specifying where to deliver retrieved data; how to process the data before delivery to the target, and so on.

Figure 2:
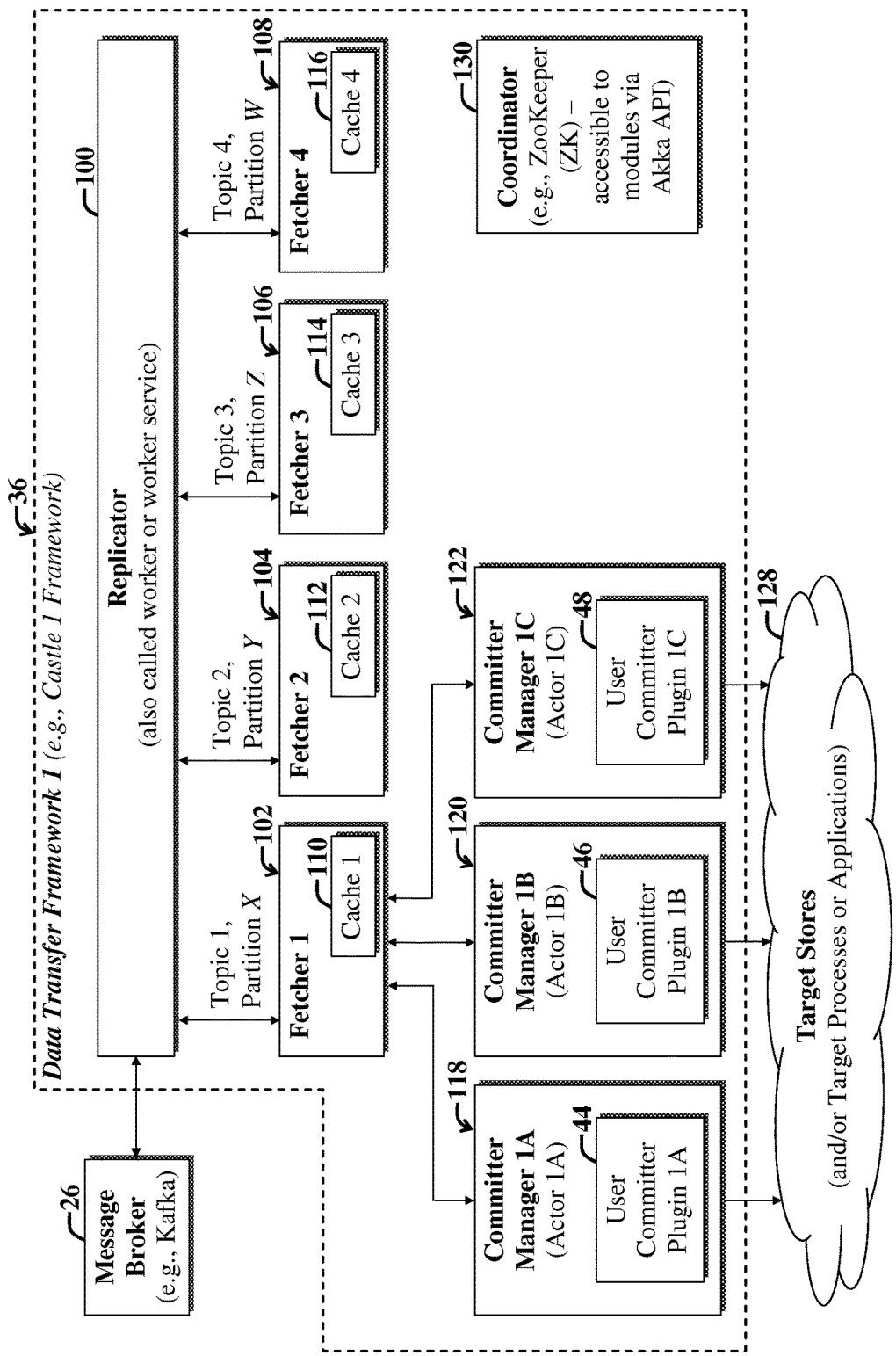
FIG. 2 illustrates additional detail of a first example framework suitable for implementing the frameworks of FIG. 1.

FIG. 2 illustrates additional detail of a first example data transfer framework 36 suitable for implementing the frameworks 36, 76 of FIG. 1. The first data transfer framework 36 includes a replicator service 100, also called a worker or worker service.

The replicator 100 includes or is otherwise a parent of plural fetcher nodes 102-108. Each of the fetcher nodes 102-108 subscribes to a particular topic and partition of the data stream output from the message broker 26, such that each fetcher 102-1084 monitors and handles one partition for a particular topic.

The fetcher nodes 102-108 include respective caches 110-116, which store a most recent portion of messages (as message batches) from the message broker 26, where the messages in cache are within minimum and maximum offset values, and where the minimum and maximum offset values are updated as additional message batches are fetched from the message broker 26 in response to fetches (e.g., in the form of message batch requests) from the fetchers 102-108, but the range (or distance) between the minimum and maximum offset values may remain substantially fixed. The fetchers 102-108 retrieve messages from the message broker 26 in batches of a predetermined byte size of messages, e.g., up to four megabytes of messages. The offset value of the first message of a given batch represents the batch offset, as discussed more fully below.

The first example fetcher 102 is shown further including or otherwise acting as a parent node to plural data transfer framework committers 118, 120, 122. The data transfer framework committer managers 118-122 include and/or act as parents of respective user committer plugins 44-48. The user committer plugins 44-48 may represent or correspond to the TSDB user committer 44, the ES user committer 46, and the DFS user committer 48 of FIG. 1, respectively. Similarly, targets 128 of the data transfer framework committer managers 118-122 and accompanying user committer plugins 44-48 may represent the targets 38-42 of FIG. 1.

A system coordinator (e.g., Apache ZooKeeper (ZK), also simply called ZooKeeper) module or node 130 includes computer code for communicating with various modules of the data transfer framework 36; checking lists of active workers (i.e., replicators), wherein the lists are arranged by names of active worker nodes (which may be ephemeral nodes); selecting leader nodes (including ZooKeeper leaders and replicator leaders) and child nodes (including Zookeeper and replicator child nodes); tracking replicator tasks, e.g., maintaining information indicating which child nodes of a particular node are workers, and which tasks are assigned to each worker; tracking message broker message batch offsets used by various committers, and so on.

For the purposes of the present discussion a coordinator service (e.g., a ZK service) may be any collection of software functionality, which may be replicated across one or more servers of a networked computing environment, wherein the software functionality is implemented by computer code for facilitating tracking activities of one or more additional modules in the networked computing environment. The one or more additional modules may include modules of a data transfer framework, including replicators, fetchers, committers, and so on.

For the purposes of the present discussion, a replicator may be any collection of software functionality that includes or uses computer code for facilitating coordination of concurrent computing tasks involving reading data from a message broker or other data stream, and eventually writing the data to a target computing resource or otherwise first transforming the data and writing the data or signal derived therefrom or thereby to a target computing resource, such as a process or application.

Note that arrowheads on various connecting lines (e.g., the lines between the committers 118-122 and the target stores 128) shown in certain figures herein may illustrate the direction of the flow of data from the message broker 26. In practice, control signaling, such as data requests, acknowledgements, thrown exceptions, and so on may flow in directions opposite to the directions indicated by the arrowheads.

Hence, the data transfer framework 36, accommodates custom code 44-48 as plugins to one or more modules 118-122 of the data transfer framework 36, wherein the one or more modules 118-122 include one or more committer managers 118-122; wherein the overhead functionality performed by the data transfer framework 36 includes functionality for providing process redundancy and redistribution of work when a process becomes unreliable; for computing task redundancy; for tracking of offsets for message batches in the data stream; for automatically assigning work to nodes in the accompanying networked computing environment, and so on.

Note that in specific implementations, the replicator 100 and accompanying children 102-108 and grandchildren 118-122 may be implemented in accordance with the Typesafe Akka toolkit (also simply called Akka herein), runtime, and associated actor model, as discussed more fully below.

Figure 3:
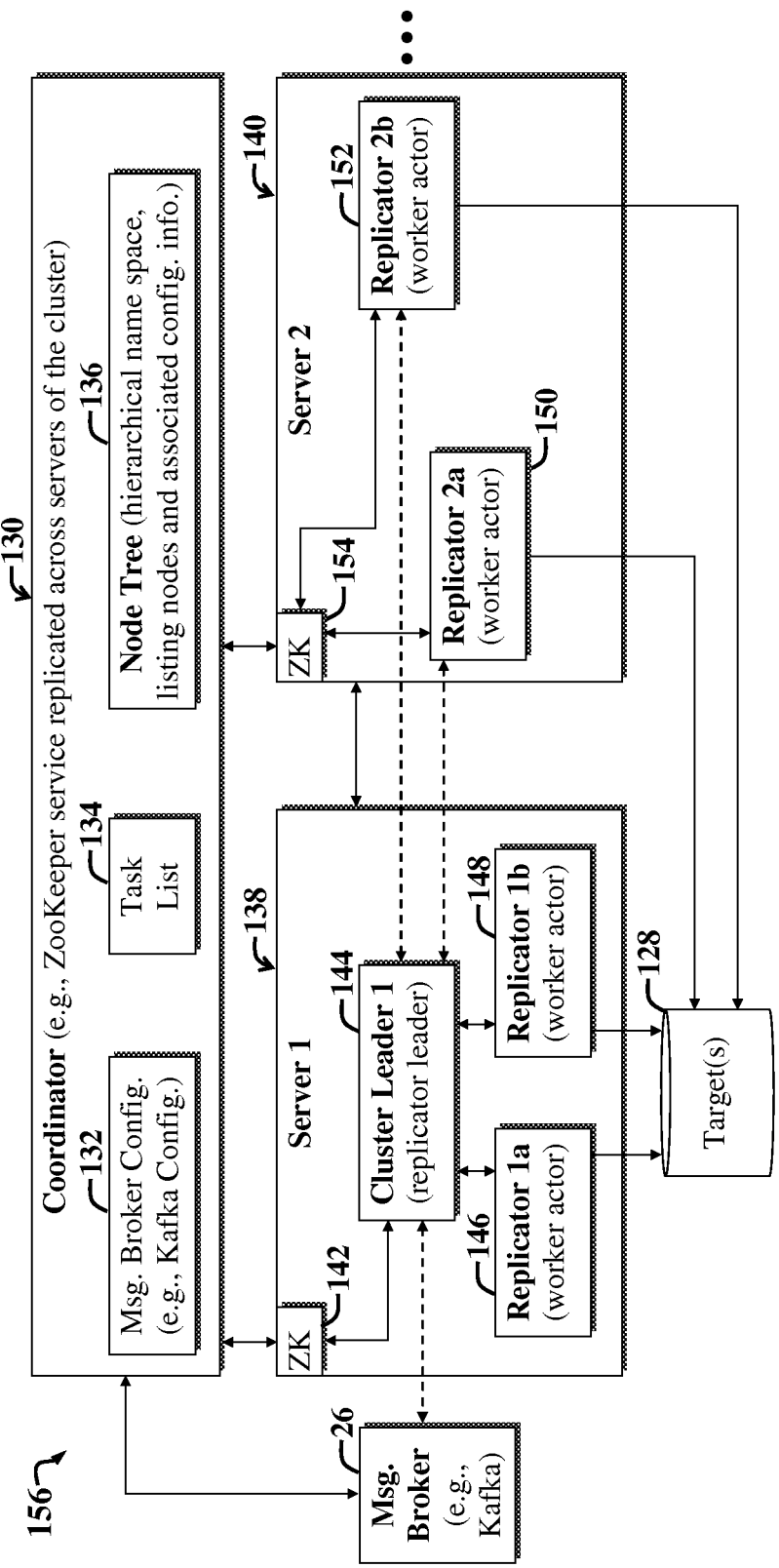
FIG. 3 illustrates additional detail of a second example framework, showing an example distribution of ZooKeeper (ZK) and replicator instances among a cluster of servers used for the second example framework, and which is suitable for implementing the frameworks of FIGS. 1-2.

FIG. 3 illustrates additional detail of a second example data transfer framework 156, showing an example distribution of coordinator (e.g., ZooKeeper (ZK)) 130, 142, 154 and replicator 144-152 instances among a cluster of servers 138, 140, and which is suitable for implementing the frameworks 36, 76 of FIGS. 1-2.

The present specific example data transfer framework 156 includes a ZK service 130, functionality of which is replicated among the servers 138, 140, e.g., as shown by replicated intercommunicating ZK components 142, 154. In the present example embodiment, in accordance with an actor model, the ZK components or nodes 130, 142, 154 include an elected leader node. For example, the leader ZK node may be the first ZK node 130. Alternatively, the first ZK node 130 may be implemented via one of the other ZK nodes 142, 154, which may act as the leader ZK node.

The example ZK leader 130 includes a message broker configuration module 132, a replicator (also called worker) task list 134, and a node tree 136. The other ZK nodes 142, 154 may have similar modules, i.e., a message broker configuration module, task list, node tree, and so on. The ZK nodes 130, 142, 154 may communicate with Kafka 26, e.g., to facilitate caching message offsets for message batches and coordinating data flows among the servers 138, 140.

The message broker configuration module 132 stores information specifying how the message broker 26 is currently configured, e.g., which topics are available; which partitions occur in each topic; which offset values characterize a certain batch of messages, and so on.

The task list 134 represents a log of tasks (identifying various tasks, e.g., tasks involving retrieving certain data from Kafka 26, formatting the data, and writing the resulting formatted data to one or more of the targets 128) to be implemented by the replicators 144-152 and accompanying fetchers and committers, as discussed more fully below.

The node tree 136 represents a hierarchical name space that list nodes and associated configuration information for each node. In the present example embodiment, the nodes include the replicators 144-152 and accompanying child fetchers and grandchild committers and user committer plugins.

The first server 138 includes a replicator leader 144 (also called the cluster leader or the worker leader), which communicates with a first child replicator 146 and a second child replicator 148. In certain representations, the child replicators 146, 148 may be shown as included within the leader replicator 144 to illustrate the hierarchical relationships between the child replicators 146, 148 and the replicator leader 144. The leader replicator 144 includes computer code for communicating with both the local ZK node and Kafka 26.

Communications between the replicators 144-148 running on the first server 138 and Kafka 26 may be routed through or handled by the local ZK node and/or the ZK leader 130. In certain implementations, the replicator leader 144 may communicate directly with the message broker 26, and messages received from the message broker 26 by the replicator leader need not be routed through a ZK module or service.

The second example server 140 includes a second replicator worker 150 (replicator 2a) and a third replicator worker 152 (replicator 2b), which communicate with the replicator leader 144 on the first server 138 of the server cluster 138-140. Communications between the replicator workers 150, 152 running on the second server 140 and the replicator leader 144 may be routed through or otherwise monitored and/or tracked by ZK components, e.g., the second server ZK component 154. In certain implementations, some communications between the replicators 150, 152 on the second server 140 and the replicator leader 144 on the first server 138 may bypass the ZK nodes 142, 154.

The replicator workers 146-152 on the servers 138, 140 may include computer code for retrieving message batches directly from the message broker 26 (e.g., via one or more fetcher children of a replicator) and/or through the replicator leader 144 and ZK nodes or components 130-154. Those skilled in the art will appreciate that the various worker replicators 146-152 include or represent parents of one or more fetcher actors, each of which is associated with one or more child committer actors, each of which may have child user committer plugins for selectively writing data and/or processed versions of the data to target network resources 128.

In certain implementations, the various ZK nodes 130, 142, 154 and replicators 144-152 may conform to an actor model, such as the Akka actor model, and may leverage the Akka toolkit and runtime. Akka represents an open source collection of computing resources, including a toolkit and runtime, for facilitating construction and implementation of distributed applications running in one or more Java Virtual Machines (JVMs). Certain Akka tools facilitate orchestrating message flows between processes executing on a particular server or host.

For the purposes of the present discussion, an actor model may be any concurrent computation model and/or framework that identifies computers and/or associated software and processes that handle tasks, including sub-tasks, concurrently, as actors. The actors may make local decisions; create additional instances of actors; elect actor leaders, and so on, as they collectively participate in a concurrent computing task or collection of tasks.

Figure 4:
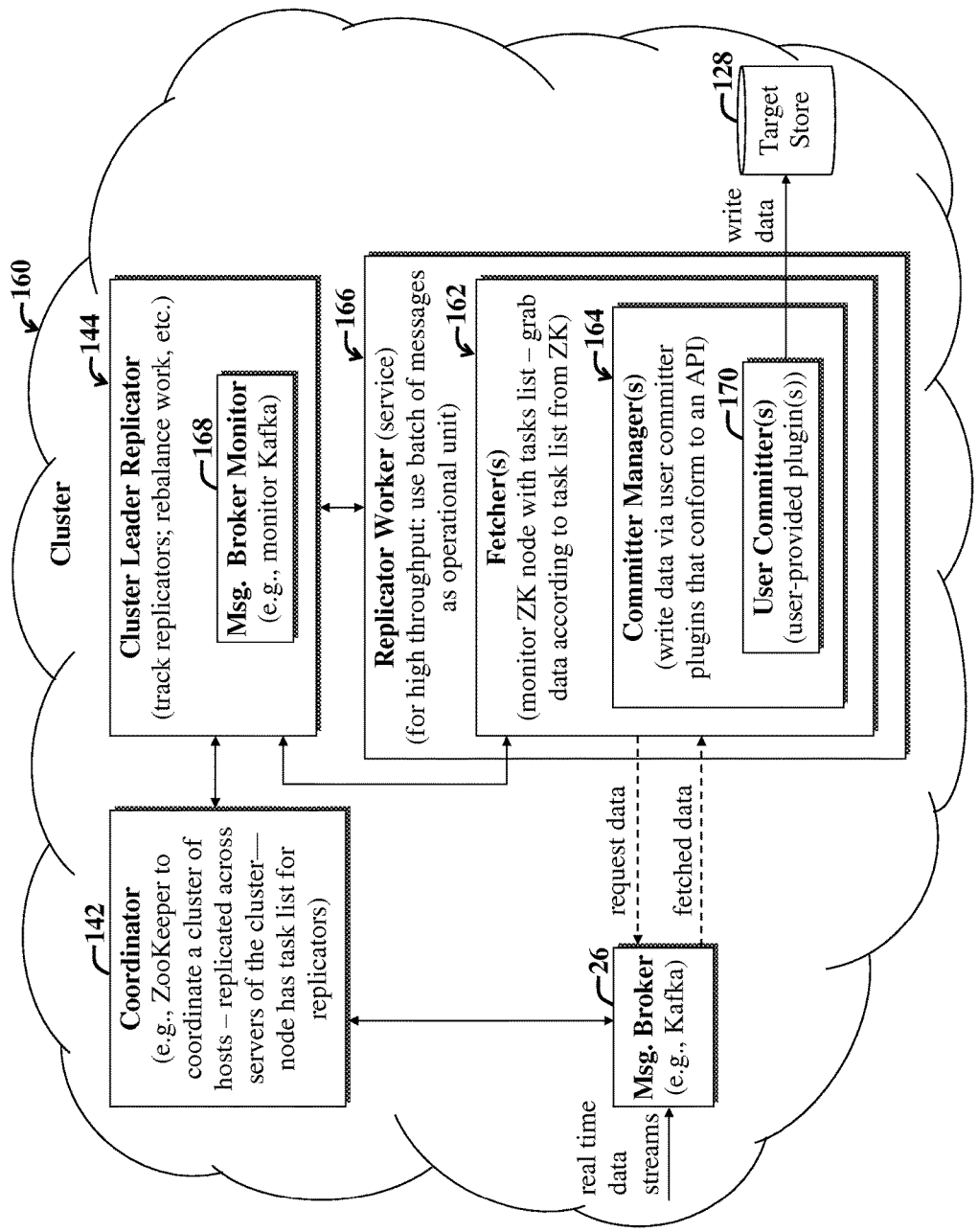
FIG. 4 illustrates additional detail of a third example framework, showing additional detail of example components running on a particular server of a cluster, and which is suitable for implementing the frameworks of FIGS. 1-3.

FIG. 4 illustrates additional detail of a third example data transfer framework implemented via a server cluster 160. FIG. 4 further illustrates additional detail of example data transfer framework components (e.g., running on a particular server of a cluster), and which is suitable for use in implementing the data transfer frameworks 36, 76, 156 of FIGS. 1-3.

The example server cluster 160 hosts a first replicator leader 144 in communication with a first coordinator module 142 (e.g., ZK module), and the message broker 26. The replicator leader 144 includes a message broker monitor 168, which includes computer code for selectively communicating with the message broker 26, including obtaining configuration information, messages, etc.

Replicator workers 166 communicate with the replicator leader 144 and may receive task assignments via the coordinator 142, and information from the message broker 26 via the message broker monitor 168. Note that in certain implementations the replicator leader 144 obtains information from or characterizing the message broker 26 through the coordinator 142, and/or the replicator leader 144 and accompanying message broker monitor 168 communicate directly with the message broker 26 for message broker information.

The message broker monitor 168 represents a child component of the cluster leader replicator 144 and includes computer code for monitoring the message broker 26 for newly added and/or removed topics and/or partitions. When the message broker exhibits changes (e.g., topic and/or partition changes) in its output data, the cluster leader replicator 144 is informed of such via the message broker monitor 168. The message broker 26 receives configuration information from the coordinator 142, e.g., ZK.

Similarly, fetchers 162 of the replicator workers 166 include computer code for requesting data from the message broker 26 and then receiving data fetched therefrom. Communications between the fetchers 162 (and accompanying committers 164) and the message broker 26 may be routed through the replicator workers 166, the replicator leader 144, and the coordinator 142. Note however, that exact message flows, routing, and signaling are implementation specific and may vary, without departing from the scope of the present teachings. For example, in certain implementations, a fetcher may communicate with the message broker 26 to determine an offset for a message batch, while the message broker 26 may communicate with the coordinator node 142 to determine the offset value to provide to the fetcher in response to a request from the fetcher.

The fetchers 162 include computer code for monitoring the coordinator node 142 and accompanying task list (e.g., 134 of FIG. 3); then getting data from the message broker 26 in accordance with the task to be performed by the fetchers 162 and accompanying committers 164. The committer managers 164 include computer code for writing data to the targets 128 via custom user committer plugins 170 that conform to a predetermined Application Programming Interface (API) or software routine library.

Figure 5:
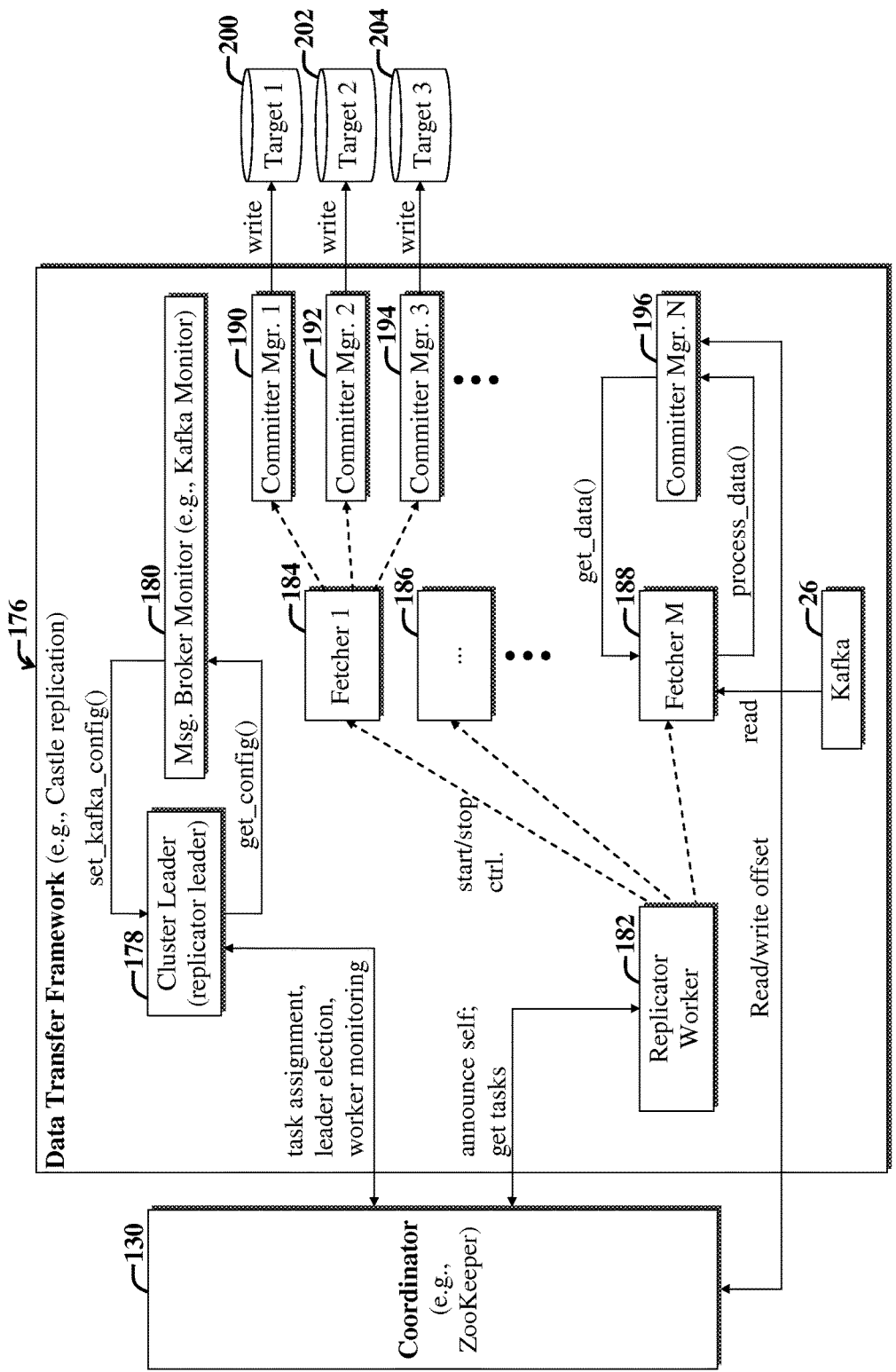
FIG. 5 illustrates additional detail of a fourth example framework, which is suitable for implementing the frameworks of FIG. 1-4.

FIG. 5 illustrates additional detail of a fourth example data transfer framework 176 which is suitable for implementing the frameworks 36, 76, 156, 160 of FIG. 1-4. The fourth example representation of a data transfer framework 176 communicates with the coordinator node 130 (e.g., ZK node) and the message broker 26 (e.g., Kafka) and includes computer code for selectively writing portions of data retrieved from the message broker 26 to target data stores 200-204.

A first leader replicator (also called cluster leader or replicator leader) 178 communicates with the coordinator node 130. The communications may include task assignment information characterizing tasks assigned to one or more replicator workers 182, leader election information (e.g., information indicating which replicator is a leader replicator), and worker monitoring information, e.g., worker status and behavior indicators and/or metrics.

The cluster leader 178 employs a message broker monitor 180 child process to get configuration information characterizing the message broker 26 via the coordinator node 130. The replicator worker 182 may communicate with the cluster leader 178 via the coordinator node 130, which may act as a leader coordinator node or may otherwise communicate with or include a leader coordinator node.

The replicator worker 182 includes computer code for announcing itself to various nodes (e.g., other nodes, fetchers, etc.) of the data transfer framework 176 and associated network computing resources 26, 130 via the coordinator 130. The replicator 182 may also retrieve task information (e.g., from a task list maintained by the coordinator node 130) to facilitate determining which tasks to implement using one or more of the fetchers 184-188.

The example replicator worker 182 includes or is otherwise a parent of plural fetcher nodes 184-188. A last fetcher node 188 is shown retrieving or reading a stream of data, e.g., a slice (corresponding to a Kafka partition) of a message topic published by the message broker 26. The accompanying committer manager 196 includes computer code for facilitating getting and processing data from the message broker 26. Other committer managers 190-194 of other fetchers (e.g., a first fetcher 184) may include similar functionality for initiating retrieval data from the message broker 26 via the associated fetcher 184; then processing the data as needed in preparation for writing all or a portion or representation of the retrieved and/or processed data to respective target stores 200. Note that a fetcher may or may not perform processing on fetched data, depending upon the needs of a given implementation.

In summary, with reference to FIGS. 1-6, example replicators discussed herein fetch data from a message broker and write the fetched data to a target. Often, the written data will require little or no modification.

For high throughput, a replicator uses a batch of messages as its basic operational unit. The committers that write the data to the target include arbitrary pieces of code (implemented as plugins) that conform to a simple API. Exact details of the API may be implementation specific, but those skilled in the art with access to the present teachings may readily select or develop an API to meet the needs of a given implementation without undue experimentation.

In various embodiments discussed herein, the replicators include various properties. For example, each committer manager receives each message from the message broker at least once. The user committer code is compiled into the same JAR (Java ARchive) as the core code used to implement the data transfer framework committer manager. Work is balanced on topic/partition pairs, as opposed to resource use. A replicator runs in a cluster and is resilient against machines going down. Work is automatically rebalanced if machines are added to the cluster. The mapping between topics and committers is statically configured. Note however, that implementations of embodiments discussed herein are not limited to use of replicators with all of the above properties.

An Akka toolkit and runtime may facilitate providing functionality for orchestrating all the participating components of a data transfer framework within a single host (e.g., server computer). A coordinator (e.g., ZooKeeper) may coordinate a cluster of these hosts.

Various actors involved may be identified by name space paths, which identify nodes in an associated coordinator node tree (such as the note tree 136 of FIG. 3). For example, a cluster leader may be identified by a cluster leader path (e.g., /user/ClusterLeader). The cluster leader participates in leader election.

Once a replicator (also called replicator actor or replicator worker) becomes a cluster leader, it is responsible for keeping track of which replicators are available to do work, and further governs rebalancing work across these replicators when any replicators go offline or otherwise malfunction; when new replicators are added; or when the message broker topics and/or partitions change. Note that only one replicator leader actor is needed for implementation of certain data transfer frameworks discussed herein.

A message broker monitor actor may be identified by a message broker monitor path (e.g., /user/ClusterLeader/KafkaMonitor). The message broker monitor actor is a child node or actor of the cluster leader (i.e., replicator leader); monitors the message broker for topic/partition changes; and notifies the cluster leader of any such changes. Only one message broker monitor is needed for implementation of certain data transfer frameworks discussed herein.

A replicator worker (e.g., with example name space path: /user/ReplicatorWorker) represents an actor that registers itself as available to do work, and then monitors a ZK node that contains the tasks that the replicator worker must work on as a list of topic/partition pairs.

A fetcher (e.g., with example name space path: /user/ReplicatorWorker/Fetcher) is a child of a replicator actor. The fetcher (also called the fetcher actor) may spawn committer managers as children, and may service requests for data made by the resulting child committer managers by fetching data (or facilitating the fetching of data) pertaining to the requests from Kafka on behalf of the child committer managers. A fetcher may also perform local caching so that requests for the same data by multiple committers are not issued to Kafka multiple times.

A committer manager actor (e.g., with a name space path: /user/ReplicatorWorker/Fetcher/CommitterManager) is a child of a fetcher actor. The committer manager actor (also simply called committer manager) runs user committer code (e.g., custom committer plugins) that implements commits to an associated target. A committer manager may also manage offsets of data read and offsets of data committed, so as to ensure that the user commit code has access to each Kafka message at least once. Each fetcher can have several committer manager children.

In general the load on a coordinator (e.g., ZooKeeper (ZK)) by a replicator service is relatively low (when compared with conventional MapReduce implementations for implementing data transfers from Kafka to target stores). A coordinator node tree may include various relevant name space paths specifying actors of a data transfer framework implementation. Examples of name space paths that may be included in a coordinator node tree include: /replicator/workers/active/<host_name>, which represents a list of active workers in a server cluster. The list of active workers will include ephemeral nodes that disappear from the coordinator node tree when corresponding active worker actors go offline.

Another example coordinator node tree path includes: /replicator/leader/ . . . . The associated node (and children of the node) identified by this path are usable for leader election. The children replicators (e.g., replicator workers) here are identified by ephemeral entries in the coordinator node tree, such that if a child replicator goes off line, it's corresponding name and path in the coordinator node tree will be removed.

Another example name space path: /replicator/workers/tasks/ . . . . The children of the node identified by this path include the various workers and their assigned tasks. An example format is: /replicator/workers/tasks/<host_name>/<topic>/<partition>/replicator/committers/ . . . . The children of this node contain the message broker message batch offsets (e.g., Kafka offsets) for all of the different committers. An example format for identifying the children is: /replicator/committers/<committer_type>/<topic>/<partition>/offset.

A replicator actor (also simply called replicator) may continuously attempt to become the cluster leader. When the replicator becomes the leader, it will continue to be the leader unless there is a non-recoverable coordinator error or other exception. If a replicator goes offline, the parent of the replicator will attempt to restart it.

When the replicator becomes the leader it will keep a coordinator watch on the children of /replicator/workers/active. As replicators come online or disappear, this coordinator node will change, and the leader will rebalance the work across the list of active workers.

A replicator may incorporate various functionality, such as functionality for creating a coordinator connection/session in a constructor; functionality for tracking leader identifications (IDs) for the specific cluster leader. The leader ID is unique across all hosts in a server cluster. A replicator may further include message broker monitoring functionality that may include a mechanism for tracking (e.g., setting a toggle) when an actor becomes a leader during a check of children nodes of the replicator.

A message broker monitor actor (e.g., Kafka monitor) represents a child of the cluster leader. The message broker monitor monitors the message broker for new topics or topic removal and notifies the cluster leader of changes. State information that reflects the message broker configuration is obtained from a coordinator node and is not stored locally in various specific embodiments discussed herein.

A replicator worker (also simply called replicator or replicator actor) represents a top level actor that may create fetcher actors as children. The replicator will also respect the maximum number of active fetchers specified in data transfer framework configuration information (e.g., as maintained by a coordinator node). In various specific example embodiments discussed herein, the maximum number of fetchers allowed per replicator is limited order to prevent a host (e.g., server) from becoming overloaded. A key task of a replicator is to monitor a coordinator node that specifies a description or identification of the work (e.g., computer processing) for which the replicator is responsible.

Name space entries identifying nodes in a coordinator node tree that pertain to a replicator include, for example, a node characterized by the following path: /replicator/workers/active/<host_name>. Nodes corresponding to this path represent ephemeral nodes that identify which replicator workers are available for processing. Another example path: /replicator/workers/tasks/<host_name>/<topic>/<partition>, names or identifies non-ephemeral nodes that specify or contain a description of the work assigned to a particular host. A replicator may monitor its own path via a coordinator, and the replicator leader may write to the paths (e.g., of a coordinator node tree) in the coordinator pertaining to the replicator.

A fetcher may employ a message broker topic name and partition name to map data from the message broker for use by a committer. If a child committer of a fetcher fails (e.g., goes off line), the fetcher will log this event, and then periodically try to restart the child (e.g., using truncated binary exponential back off). Hence, when one of the targets for a committer goes offline and then quickly comes back online, then during sufficiently short down-time intervals, no other committers will be affected.

Figure 6:
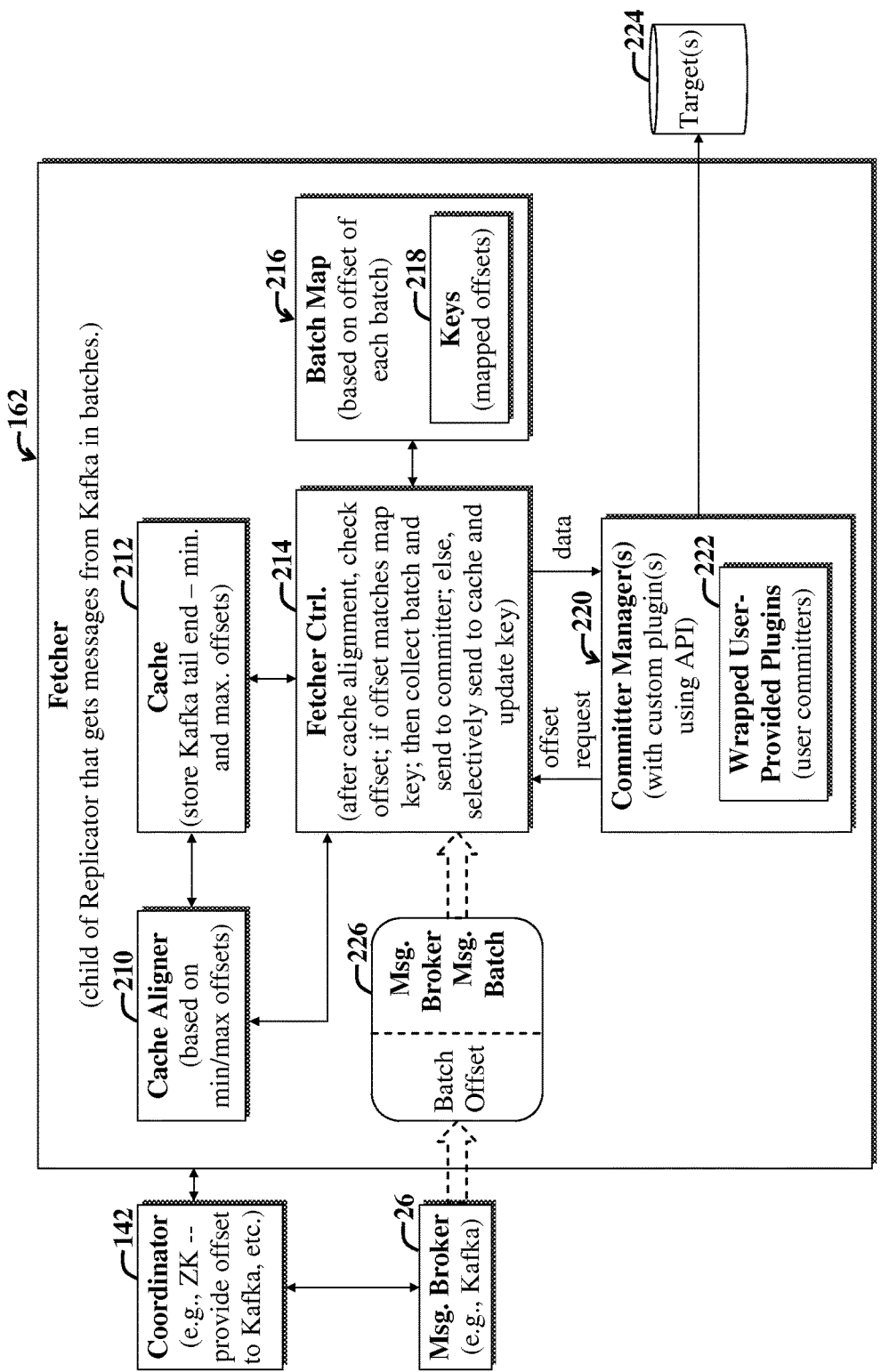
FIG. 6 illustrates additional detail of a first example fetcher, which is suitable for implementing the fetchers of FIGS. 2-5.

FIG. 6 illustrates additional detail of a first example fetcher 162, which is suitable for implementing the fetchers shown in FIGS. 2-5. The example fetcher node 162 includes a fetcher controller 214 in communication with a cache aligner 210 and cache 212 for storing sequences of messages obtained from the message broker 26 to be accessible via one or more of the committer managers 220 and accompanying user-provided plugin(s) 222 (which are wrapped or contained within the committer manager(s) 220). The fetcher controller 214 further communicates or maintains a batch map 216 with keys 218 corresponding to different batch offsets.

The fetcher controller 214 further communicates with the message broker 26, e.g., to issue data requests from the one or more committers 220. Communications between the fetcher controller 214 and the message broker 26 may be routed though and/or monitored by one or more parent or ancestor nodes, such as a parent replicator node and a grandparent leader replicator node.

In the present specific example embodiment, the message broker 26 issues messages in batches (consistent with message broker configuration information maintained by the coordinator 142) which arrive at the fetcher controller 214 when the message batches represent a particular Kafka topic and topic partition to which the fetcher 162 is subscribed. An example message batch 226 is shown being transferred to the fetcher controller 214.

In general, a fetcher subscribes to one topic of a message broker data stream, and one partition of the topic. The topics may be pre-categorized in the message broker 26. A partition may refer to a slice of a given topic stream provided by the message broker 26.

The fetcher controller 214 includes computer code for checking the batch offset of the message batch 226 with reference to keys 218 in the batch map 216. If a match occurs, the fetcher controller 214 collects the batch 226 and makes it available to the one or more committer managers 220 and accompanying user committer plugins 222. The batch 226 may be forwarded directly to the committer(s) 220 or may be otherwise cached in the cache 212 for subsequent use by the committer(s) 220.

The user committer plugins 222 receive the message batches; selectively process the message batches; and then write them or portions thereof to one or more targets 224.

When the committers 220 initially start up, each of the committers 220 may be requesting messages with different offsets that exceed maximum and minimum offset values of messages stored in the cache 212. The exact minimum and maximum offset values 210 may be determined by the cache aligner 210, which ensures that the range between minimum and maximum cached offsets are within a predetermined fixed range and which further includes code for selectively delivering portions of requested message batches to committers to facilitate cache alignment, as discussed more fully below. Note however, that dynamic or variable cache ranges may be employed in certain embodiments, without departing from the scope of the present teachings Sometimes the cache will have a portion of the messages of a given requested batch. This portion may be given the committer requesting the portion so that the next message batch requested by the committer will have an offset that aligns with a message batch offset in the cache, as discussed more fully below.

Upon initial startup, when one or more of the committers 220 request a message batch with an offset that falls outside of the maximum and minimum range of offsets (of messages that are cached in the cache 212), the requesting committer gets the portion of the message batch that includes message offsets (of messages in the batch 226) that fall within the specified maximum and minimum offset values. This helps committer requests for message batches to eventually sufficiently align with requests of other committers so that the committers 220 can share use of data in the cache 212.

A batch, such as the message batch 226, may be of a specific length corresponding to the number of messages in the batch, e.g., four messages. Note that exact batch sizes are implementation specific and may vary, without departing from the scope of the present teachings.

In general, when a fetcher of a data transfer framework discussed herein caches a portion of a data stream from the message broker (e.g., a leading portion of data output from the message broker 26), all committers 220 of the fetcher 162 have access to message data in the cache 212. By caching the message broker data in local memory 212, and then sharing the cached data from the message broker stream, this facilitates reducing replication of the message broker stream directly to the various targets 224. This may reduce network bandwidth consumption. In general, use of the cache 212 may increase the efficiency of communications between the message broker clusters supporting the message broker 26 and server clusters supporting a data transfer framework and accompanying fetcher(s) 162.

Those skilled in the art will appreciate that exact values of or ranges between minimum and maximum batch offset values are implementation specific and may vary. In general the minimum-maximum offset ranges may be a function of the number of committers 220 supported by the fetcher 162, where more committers may demand a larger cache 212 to maximize efficiency.

In summary, the fetcher 162 gets messages from the message broker 26 in batches. A batch contains N messages, wherein each message has its own offset value. The message batch is identified by the offset of the first message in the batch.

In general, when caching the messages of a batch, a fetcher keeps a map from offset to the batch associated with this offset. When the fetcher receives a request for a particular offset, the fetcher could check whether this offset is one of the keys in this map, return the corresponding batch, or fetch if the offset is not a key in the map and then store it in the cache. However, without initial cache alignment as discussed herein, initial starts of arbitrary user committers that have no offset specified could result in the committers starting with misaligned offsets that would never converge, thereby obviating use of the cache.

In general, fetcher cache alignment in accordance with the present example embodiment includes keeping the minimum and maximum message offset that is available in the cache. When a request (arrives at the fetcher) for an offset that does not match a key in the cache, then the fetcher checks if the offset falls in the range of the minimum and maximum cache offsets. If the offset falls within the range, then batches in cache are processed to check if the message offsets indeed contain the specific offset that is being requested.

Once the specific offset is found, then the associated portion of the message batch is sliced from cache, and the sliced batch portion characterized by the requested offset is returned to the requesting committer. This results in an alignment of the next request, as the last offset in the batch will be the same for all user committers requesting the offset. And all subsequent requests from aligned committers result in a cache hit, as may be determined via a hash table lookup.

Note that if the downstream components of a particular user committer begin operating poorly, go offline, or experience other issues, the downstream components (e.g., target data bases) may fall behind in consuming the message broker data and may temporarily not be using the cache of a fetcher. If this happens, the user committers would be requesting old messages with old offsets with respect to offsets in the cache. The fetcher protects against this scenario by only accepting keys into the cache that are greater than the maximum offset that is available within the cache. When the cache fills up, the oldest key is dropped.

Also note, regarding sending data to a requestor user committer for processing, Akka provides at most one guarantee for delivery of a message. Akka will not deliver a message to another actor if that actor terminates before or during the processing of the message, which causes the message to be lost. However, this issue is not problematic for various data transfer framework implementations discussed herein, as the requester (e.g., user committer) is a child actor (e.g., of a fetcher) that will be restarted if it terminates or goes offline. Once restarted, the user committer will re-obtain the offset from ZK, and then re-request any lost message.

Figure 7:
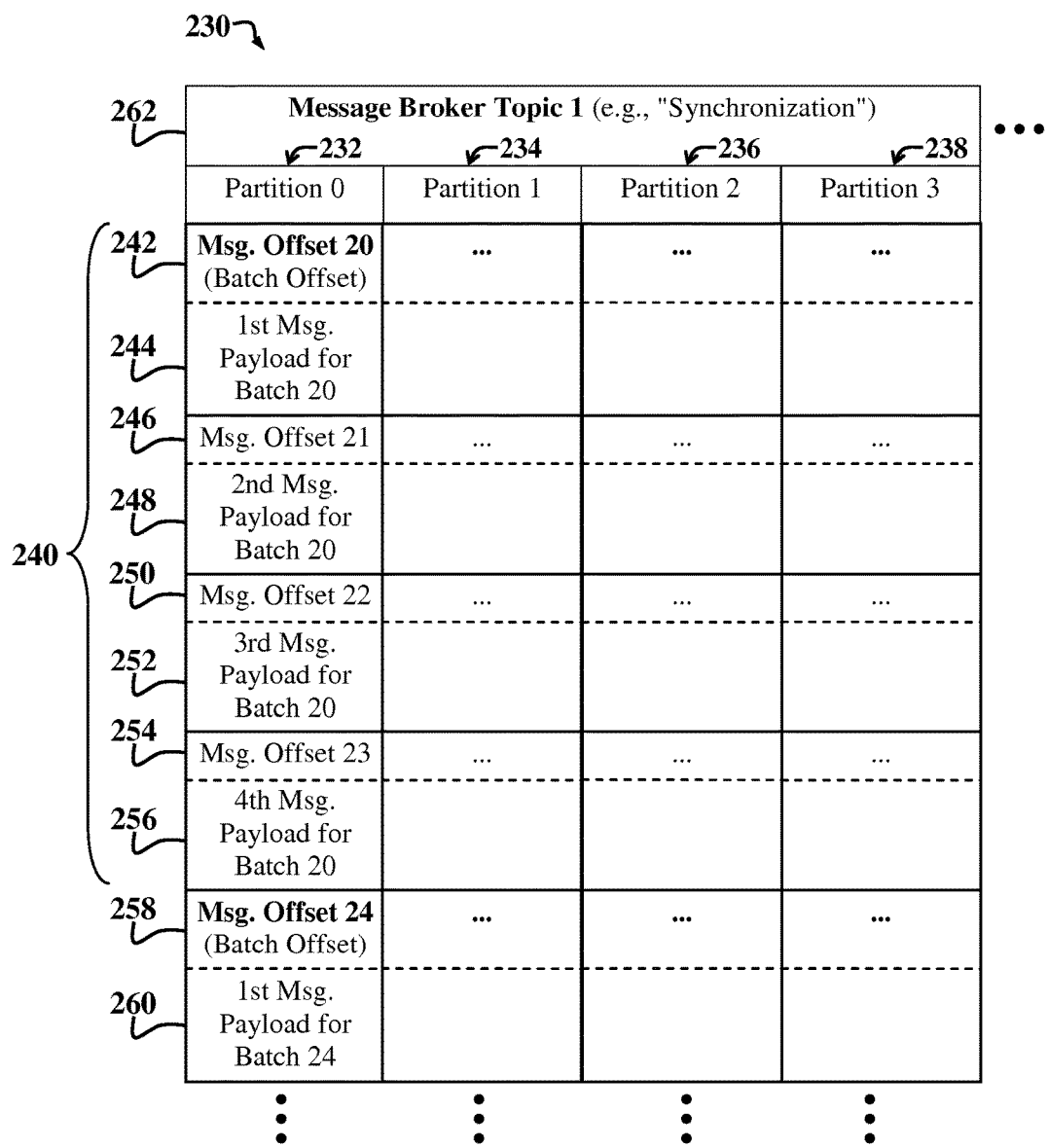
FIG. 7 illustrates an example portion of a message broker data stream topic and accompanying partitions to which a fetcher may subscribe.

FIG. 7 illustrates an example portion of a message broker data stream topic and accompanying partitions 230 to which a fetcher may subscribe. In general, a fetcher subscribes to a particular message topic and partition from a message broker, and the associated data is then available to a committer manager and accompanying user committer owned by the fetcher, i.e., that are children of the fetcher.

The example message broker data 230 includes data for a particular topic (e.g., a topic called "Synchronization," also called "Sync"). The example message broker data 230 includes four example partitions 232-238 within a first topic (as indicated by an example topic header 262), including a zeroth partition 232, a first partition 234, a second partition 236, and a third partition 238.

The zeroth partition 232 is shown streaming a first batch of messages, which are temporarily available in message broker queues corresponding to the zeroth partition 232. The example zeroth partition 232 may act as a First-In-First-Out (FIFO) queue, where the rate at which messages are discarded from the partition 232 is implementation specific and may vary. An example message broker may discard messages at a rate such that after X days (e.g., 10 days), all of the messages in the partition 232 are replaced with newly acquired messages.

The example first message batch 240 for the zeroth partition 232 (also called Sync 0 partition) is identified by a first message offset 242, where the offset value is 20. The example offset value represents the batch offset, i.e., the offset of the first message batch 240, as it represents the offset of the first message 242, 244 of the batch 240. The first message 242, 244 includes a message payload, which represents data included in the first message 242, 244.

A second example message 246, 248 of the message batch 240 includes a message offset 246 with a value of 21. The second example message 246, 248 also includes a second message payload 248. Similarly, the first message batch 240 includes a third message 250, 252, and a fourth message 254, 256, with offsets 250, 254 (corresponding to message offset values 22 and 23) and payloads 252, 256, respectively.

A second message batch 258, 260 begins with a second batch offset 258 (with offset value 24) and corresponding payload 260. Note that the length of a given partition, i.e., the numbers of messages held in the partition at a given time, is implementation specific and may vary depending upon the needs of a given implementation. Furthermore, note that other partitions 234-238 (Sync 1, Sync 2, and Sync 3 partitions) may have similarly structured collections of messages and batches as shown for the Sync 0 partition 232, with data that varies based on the partition. Furthermore, note that the determination or identification of a batch of messages need not occur in the message broker partitions 232-238, but may be defined individually by fetchers and/or committers subscribed to a given topic/partition pair.

In general, data available via a message broker may include several topics, each with different partitions to which a fetcher may subscribe. Furthermore, note that while the example message broker data 230 only shows four partitions 232-238, that a particular topic may have more or fewer partitions. Furthermore, note that while an example message batch 240 is shown including four messages, that a batch may have a different number of messages (characterized by message offsets 20-24), without departing from the scope of the present teachings.

The zeroth partition (Sync 0) 232 may represent, for example, a 20 megabit per second data stream. By selectively caching a recent portion of the stream, a fetcher can enable committers to access the data without the need to unnecessarily replicate the relatively high bandwidth stream for each committer. Accordingly, use of the cache, as discussed more fully below, may mitigate excessive network bandwidth consumption.

A given committer may issue a request to an accompanying data transfer framework to read from the message broker data 230. The data transfer framework then pulls (i.e., reads) data from a topic/partition pair provided by the associated message broker.

The data transfer framework may communicate with a requesting committer (e.g., via a replicator and child fetcher) to determine whether the requested message batch was processed and/or cached, or alternatively, the data transfer framework assumes that a delivered message batch was processed or cached without a problem if no exceptions were thrown, i.e., if no problems or flags are detected by the data transfer framework. After the delivered message batch was processed or cached without detected error, the data framework may then read the next message batch from the message broker data 230 and deliver it to the subscribed fetchers for use by child committer managers thereof.

Hence, message data 230 of an example message broker is organized by topic and partition. In general, a topic may represent a logical grouping of messages that belong together, as predetermined via settings of the message broker. Various offsets assigned to different messages may be issued by a reducer that writes to or otherwise supplies the message broker with data for various topics and partitions.

In general, a user committer, e.g., custom committer plugin is not required to include computer code for keeping track of message offsets, as the task of tracking message offsets and batch offsets may be handled by an accompanying data transfer framework.

If a given user committer plugin (and/or associated committer manager and/or fetcher) crashes or otherwise triggers a fault during fetching of a message batch, then the associated data transfer framework may automatically attempt to restart the user committer plugin. After restart of the user committer plugin, the user committer plugin proceeds to catch up with messages stored in an associated fetcher cache. In general, in embodiments discussed herein, user committer plugins are configured to consume data from a message broker faster than data populates the message broker.

Accordingly, a properly functioning user committer plugin will eventually catch up to the most recently available portions of data available from a message broker, the messages of which may be cached in a fetcher. A fetcher may store a predetermined portion of most recently available messages from a message broker for a particular topic and partition to which the fetcher is subscribed. User committer plugins eventually catch up with data available in respective fetcher caches. Accordingly, a fetcher with properly functioning plural committer plugin instances will include plural user committer plugins all fetching data from the same cache, containing most recently available message broker data.

Note that while the diagram of the example message broker data 230 is shown as including adjacent partitions for a particular topic, that in practice, different message broker partitions may be provided by different hosts, e.g., servers.

In general, when a user committer plugin starts up, the associated parent committer manager communicates with a coordinator (e.g., ZooKeeper), which then determines a relevant offset for a particular topic and partition pertaining to requested data. The communication between the parent committer manager and the coordinator may occur via a message broker API (e.g., a Kafka API). Each consumer committer is allocated a particular consumer ID, and the consumer ID is available to other system components (e.g., actors) via the coordinator.

A message broker monitor may determine, for example, that the appropriate offset is "offset 20." The committer may then ask the parent fetcher process to get data from, for example, Sync 0 partition. If the fetcher lacks data from the requested partition, then the fetcher may retrieve and cache the data from the message broker (if the data is characterized by message offsets greater than message offsets already available in fetcher cache), as discussed more fully below. If the fetcher cache includes the requested data, then the data is provided from the fetcher cache to the requesting committer manager and accompanying requesting user committer plugin.

Figure 8:
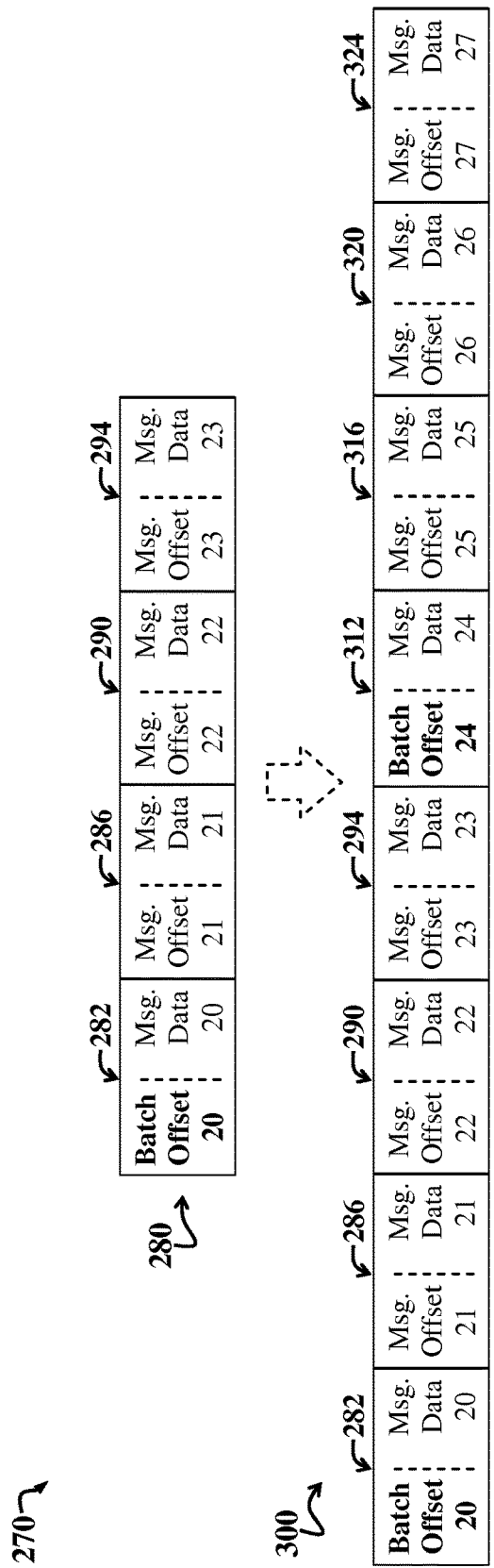
FIG. 8 illustrates an example start up sequence of messages and accompanying batches in a cache of a fetcher, as the cache is updated with a new message batch, resulting in updated cache data.

FIG. 8 illustrates an example start up sequence of messages 270 and accompanying batches in a cache of a fetcher, as the cache is updated with a new message batch, resulting in updated cache data. Upon initial startup, a cache may be empty; then transition to a first cache state 280; then to a second cache state 300, as batches and accompanying messages are added to cache.

In the first example cache state 280, the cache includes a batch of four messages 282-294, where the message batch is characterized by a batch offset (e.g., batch offset value 20), which also represents the batch offset of the first message 282 of the batch. Note that while, in the present example embodiment, message batches include four messages, that other numbers of messages may be included in a batch, without departing from the scope of the present teachings.

Subsequently, a user committer plugin may request a next batch of four messages 312-324, which is retrieved (e.g., from a message broker) and cached by the associated fetcher, resulting in the updated cache state 300. The second cache state 300 is characterized by messages 282-294 of the first cache state 280, augmented with messages 312-324 of a second message batch (identified by an example batch offset value of 24). Note that the exact number of message batches and associated messages that can be held in a particular fetcher cache are implementation specific and may vary.

Generally, when user committer plugins start up, they may be requesting data associated with different offsets. For example, one user committer plugin may be initially requesting data associated with a second message (e.g., characterized by message offset 21) 286, whereas another user committer plugin governed by the same fetcher may be requesting data associated with a first message 282 (characterized by message offset 20).

However, since messages are retrieved into fetcher cache in batches, the requests are to be eventually aligned with batch offsets. To do this, cache slicing is performed. For example, a first committer plugin requesting data of a message batch identified by a batch offset of 20 will be given the full available batch of messages 282-294, whereas a user committer plugin requesting data from a batch identified by an offset of 21 will only be given messages 286-294, i.e., a sliced batch including messages characterized by offsets 21, 22, and 23. In this way, subsequent message requests from the second committer plugin will then be aligned with subsequent requests by the first committer plugin, and the subsequent request will correspond to the second batch of messages 312-324 identified by a batch offset value of 24, and which includes messages characterized by batch offset values 24, 25, 26, and 27.

To do such slicing, a fetcher controller may first reference a batch map to check ranges of messages that are in cache, as implied by batch offsets currently in the cache, where the batch offsets currently in the cache correspond to keys in the batch map.

The fetcher controller may determine, for example, if the initially requested message batch starting from a message offset of 21 is determined to fall somewhere in the cache, then an accompanying cache aligner is employed to truncate or slice the requested message batch. This results in alignment of subsequent requests from user committer plugins.

Once a given fetcher cache fills up, and a new message batch is requested that is not in the cache, then the oldest message batch in the cache is dropped to make way for the new message batch, which is then cached.

Furthermore, note that if a user committer plugin goes offline for a given time interval and then comes back online, the user committer plugin may be requesting data that is no longer available in fetcher cache. In this case, the fetcher cache will not be augmented with old data, but rather, the request may be dropped, as the requested data may be too old to warrant synching up with more current user committer plugin data requests. Alternatively, the request is fulfilled directly from the message broker data stream until the user committer plugin catches up with recent data in the fetcher cache.

Hence, in the present example embodiment, a fetcher receives messages from a message broker in batches. A batch may contain, e.g., N messages, each message with its own offset. The batch is identified by the offset of the first message in the batch. When caching the messages, the fetcher keeps a map from offset to the batch associated with this offset. When a request for a particular offset request comes to the fetcher, it could naively check whether this offset is one of the keys in this map; then return the corresponding batch, or fetch the batch characterized by the offset if the offset is not a key in the map, and then store it in the cache. However, this approach is usable after cache alignment, as opposed to before cache alignment, as initial starts of arbitrary user committers that have no offset specified could result in them starting with misaligned offsets that would never converge, and the cache would be substantially useless.

By way of example, the naive approach without using initial cache alignment results in requests not conversion, as follows:

Example user committer A requests offset=20. The fetcher controller determines that the offset 20 is not a key in the local batch map; so the fetcher retrieves a batch of 4 messages from the message broker for offset=20. The batch may be denoted, for example: [(20, data), (21, data), (22, data), (23, data)]. The retrieved batch is then given to the example user committer A, and the fetcher caches the data and updates the local batch map to read, for example:

Key(20)->Value([(20, data), (21, data), (22, data), (23, data)]).

To continue the example, now suppose that example user committer B requests offset=22. The fetcher controller determines that the offset 22 is not a key in the batch map; so the fetcher gets a batch of 4 messages for offset=22. The batch may be denoted, for example: [(22, data), (23, data), (24, data), (25, data)]. The retrieved batch is then given to the example user committer B, and the fetcher caches the data and updates the local batch map to read, for example:

Key(20)->Value([(20, data), (21, data), (22, data), (23, data)]);

Key(22)->Value([(22, data), (23, data), (24, data), (25, data)]).

Continuing the example, now user committer A requests the next offset after the last message offset of the last received message batch. This offset=24, which is one higher than the last message in the batch it received. The fetcher controller then determines that the offset 24 is not a key in the batch map; so the fetcher gets a batch of 4 messages for offset=24. The batch may be denoted, for example: [(24, data), (25, data), (26, data), (27, data)]. The retrieved batch is then given to the user committer A, and the fetcher caches the data and updates the local batch map to read, for example:

Key(20)->Value([(20, data), (21, data), (22, data), (23, data)]);

Key(22)->Value([(22, data), (23, data), (24, data), (25, data)]);

Key(24)->Value([(24, data), (25, data), (26, data), (27, data)]).

The user committer B would then request the next offset from the batch it received, which would be offset=26, which is one higher than the last message in that batch. It is now evident that user committer A and committer B are unlikely to ever request similar batches that would result in a cache hit, as the requests are slightly out of phase and will continue to cause requests to go out to the message broker, as opposed to the cache. However, the cache clearly contains messages with the offsets that are actually being requested which is also resulting in duplicate data in the cache.

A parallel example of how cache alignment, as discussed herein, solves this issue follows below. In summary, minimum and maximum message offset values that are available in cache are indicated in the local batch map. When a request for an offset arrives at the fetcher, where the offset value that does not match a batch key in the cache, then the fetcher controller checks if the requested batch offset falls within the range of the maximum and minimum offset values in the cache. If so, then message batches in the cache are analyzed to confirm that a message corresponding to the requested batch offset indeed corresponds to an offset of a message in the cache.

Once the offset with the requested, an associated batch containing the offset is sliced, and messages of the batch beginning with requested offset are returned to the requesting user committer. This results in an alignment of the next request, as the last offset in the batch would be the same for all user committer plugins requesting said offer. And, subsequent requests from aligned user committers result in a cache hit, with a fast hash table lookup. To illustrate this, the above example is modified as follows:

Example user committer A requests offset=20. The fetcher controller determines that the offset 20 is not a key in the local batch map; so the fetcher retrieves a batch of 4 messages for offset=20. The batch may be denoted, for example: [(20, data), (21, data), (22, data), (23, data)]. The retrieved batch is then given to the example user committer A, and the fetcher caches the data and updates the local batch map to read, for example:

Key(20)->Value([(20, data), (21, data), (22, data), (23, data)]).

Continuing the example, now suppose that example user committer B requests offset=22. The fetcher controller determines that the offset 22 is not a key in the batch map, but now, the fetcher controller determines if offset 22 falls within the minimum and maximum range, which is now 20-23, and in this case, it does.

The fetcher then searches the first batch for an offset of 22; finds the offset; and returns to the user committer B a slice of the batch. The slice may be denoted, for example: [(22, data), (23, data)]). The sliced portion is delivered to the user committer B from local fetcher cache, without requiring the fetcher to retrieve additional data from a message broker.

The user committer A now requests the next offset after the last offset of the sliced message batch. This offset=24, which is one higher than the received sliced batch, which represents a partial batch. Since batch 24 is not a key in the local batch map, the fetcher gets a batch of 4 messages for offset 24 from a message broker. The batch 24 may be denoted, for example: [(24, data), (25, data), (26, data), (27, data)]. The retrieved batch is then cached and delivered to the user committer A and updates the local batch map to read, for example:

Key(20)->Value([(20, data), (21, data), (22, data), (23, data)]);

Key(24)->Value([(24, data), (25, data), (26, data), (27, data)]).

User committer B now requests the next offset from the batch it received, and this offset is also 24, which is one higher than the last message in the batch it received. This key is in the local batch map, and the associated message batch is then returned to user committer B from cache via a quick hash table lookup.

User committer B is now aligned with user committer A. Accordingly, subsequent message batch requests from different user committers of the fetcher will represent cache hits for either user committer A and/or user committer B, depending upon which user committer is first to request the next message batch.

The above example can be generalized to N user committers. The initial search through batches may be an O(n) operation, but need only occur once for a given session when alignment is performed. Subsequent key lookups after alignment are O(1) hash operations, and data is retrieved only once from a message broker, as long as all of the user committers are keeping up with the production of data from the message broker.

If the downstream components of a particular user committer have issues, they might fall behind for a period of time. If this happens the user committers would be requesting very old offsets with respect to offsets in the local fetcher cache. The fetcher protects against this scenario by only accepting keys into the cache that are greater than the maximum offset that is available within the cache. When the cache fills up, the oldest key is dropped.

An example method for selectively caching data from a data stream may be summarized as follows: receiving a request for a message batch identified by an offset of a message of the message batch; using the offset, with reference to a map of batch offsets occurring in a cache, to determine if a cached message batch corresponding to a requested message batch exists in a cache; if the offset of the requested message batch does not exist in the map of batch offsets, then: further checking if the offset of the requested message batch falls within minimum and maximum batch offset values characterizing the cache; if the message offset of the message batch falls within the minimum and maximum batch offset values, then: extracting messages from the cache that represent a portion of messages in the requested message batch, such that a subsequently requested message batch will be characterized by a batch offset that matches a batch offset in the map of batch offsets; if the offset of the requested message batch exists in the map of batch offsets, then: using the offset of the requested message batch to retrieve a cached message batch from the cache, the cached message batch representing the requested message batch.

The example method may further include: loading a new message offset and associated message batch into the cache only when the new message offset to be added to the cache is greater than a maximum offset that is currently in the cache; updating a key in the map of batch offsets when the new message offset and associated message batch is loaded into the cache, the key corresponding to the new message offset and representing a batch offset for the message batch loaded into the cache; and discarding an oldest message in the cache and updating the minimum and maximum batch offset values when the new message offset and associated message batch is loaded into the cache.

Figure 9:
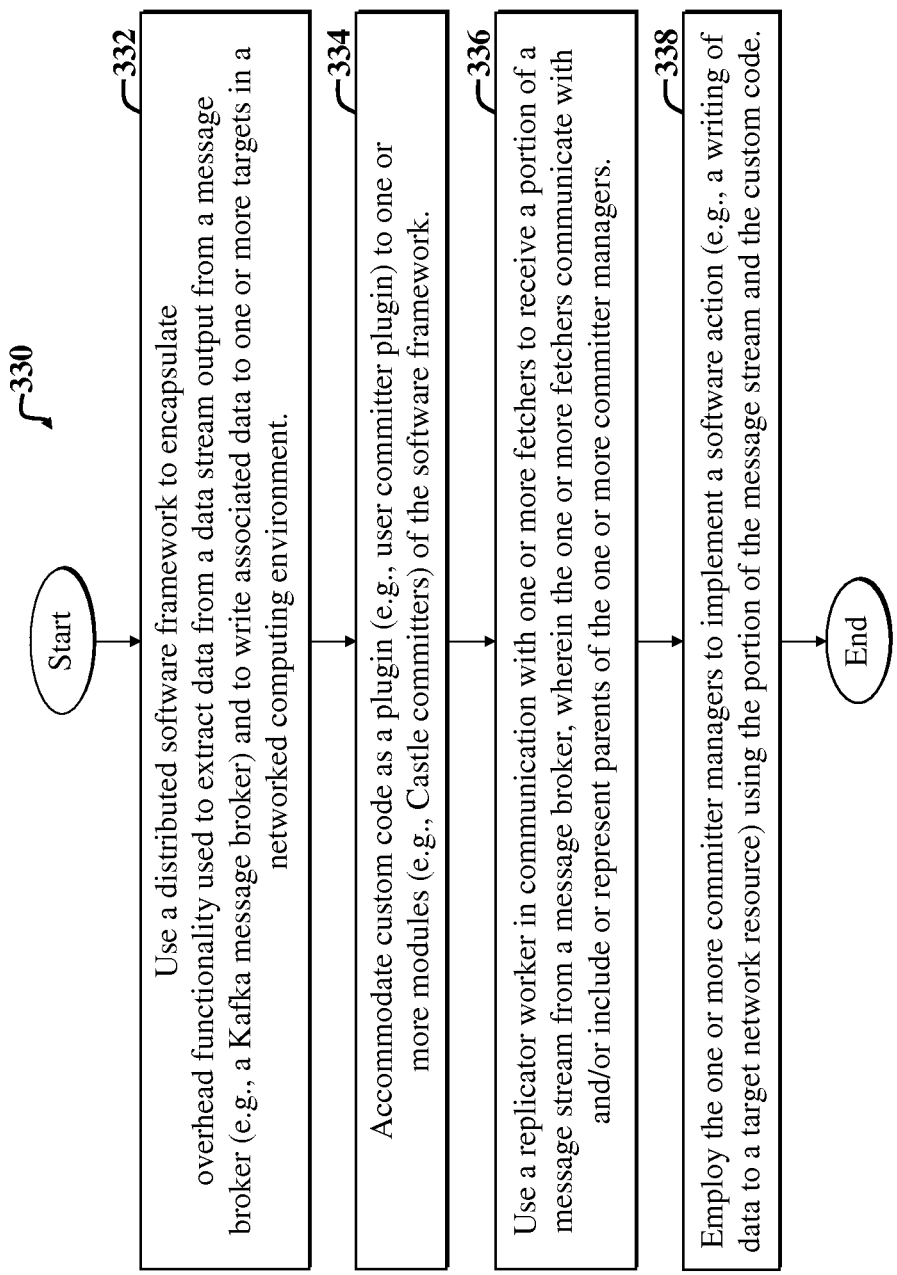
FIG. 9 is a flow diagram of a first example method implementable via embodiments of FIGS. 1-6.

FIG. 9 is a flow diagram of a first example method 330 implementable via embodiments of FIGS. 1-6. The example method 330 facilitates implementation of a computing task via concurrent computing in a networked computing environment.

A first functionality-encapsulation step 332 includes using a distributed software framework (e.g., a Castle framework) to encapsulate overhead functionality used to extract data from a data stream output from a message broker (e.g., a Kafka message broker) and to write associated data to one or more targets in a networked computing environment.

A subsequent custom code-accommodating step 334 includes accommodating custom code as a plugin (e.g., user committer plugin) to one or more modules (e.g., data transfer framework committer managers) of the software framework.

Next, a replicating step 336 includes using a replicator worker in communication with one or more fetchers to receive a portion of a message stream from a message broker, wherein the one or more fetchers communicate with and/or include or represent parents of the one or more committer managers.

Lastly, an employing step 338 includes employing the one or more committer managers to implement a software action (e.g., a writing of data to a target network resource) using the portion of the message stream and the custom code.

Note that method 330 may be altered, without departing from the scope of the present teachings. For example, the method 330 may be further augmented to specify that the distributed software framework includes a ZK service and one or more replicators, wherein the one or more replicators include the replicator worker.

The overhead functionality may further include functionality for providing process redundancy and redistribution of work when a network resource implementing the process or sub-process becomes unreliable. The overhead functionality provides for High Availability (HA) and redundancy of computing nodes, tracking of offsets for message batches in the data stream, and automatic assignment of work to nodes in the networked computing environment.

The software action implemented in the employing step 338 may include writing a portion of the message stream to a target computing resource, such as a database or computing process.

The first example method 330 may further include accommodating or incorporating custom code as a plugin to a committer manager, where the custom code includes code to transform data of the message stream in advance of facilitating writing resulting transformed data to the target network resource.

The data may be transformed by the custom code in accordance with the software action or task to yield the transformed data. The portion of the message stream may include a sequence of messages of a specified length, e.g., four messages per message batch.

The example method 330 may further include checking minimum and maximum message offsets when a request for a message batch with a particular offset arrives at a fetcher from a committer; when the requested offset does not match a batch offset key characterizing the cache, then checking the requested offset to determine if it is within the range of the maximum and minimum message offset values in the cache; if the message batch offset falls within the range, then slicing a portion of the messages in the cache, which form part or all of the requested, from the cache and delivered to the requesting committer. This facilitates alignment of committer message batch requests, such that a subsequently requested batch will now tend to be within the cache, or otherwise, the requested message batch (if a new batch) will be added to the cache for subsequent use by other requesting committers.

The example method 330 may further include employing a coordinator service (e.g., ZK service) to coordinate communications between and operations of a cluster of servers. The ZooKeeper service may include one or more components that are replicated across each of the servers of the cluster of servers. An Akka toolkit and runtime may facilitate orchestrating data flow between software components within an individual server of the cluster of servers.

The example method 330 may further include incorporating plural replicator workers, at least one replicator worker for two or more servers of the cluster of servers, to facilitate implementing a task indicated via the ZK service; and employing a replicator leader to selectively rebalance processing for different portions of the task among the replicator workers. The replicator leader may include a message broker monitor that monitors the message stream output by the message broker and selectively informs one or more replicator workers as to changes occurring in the message stream.

Figure 10:
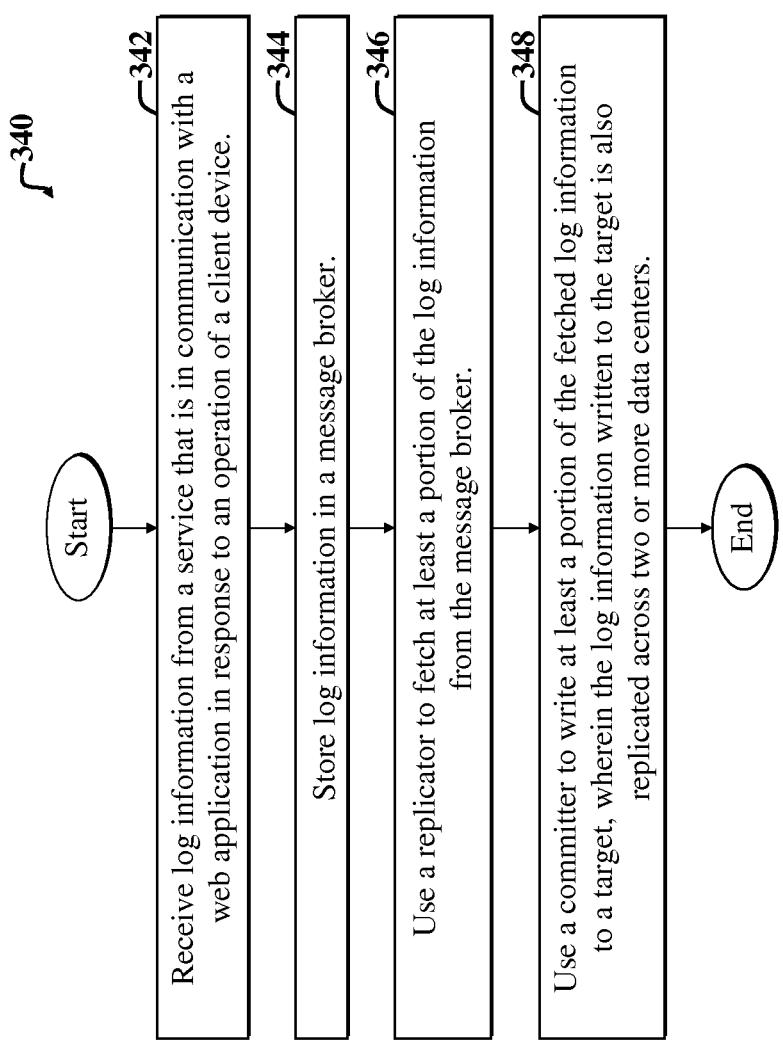
FIG. 10 is a flow diagram of a second example method implementable via the embodiments of FIGS. 1-6.

FIG. 10 is a flow diagram of a second example method 340 implementable via the embodiments of FIGS. 1-6. The second example method 340 facilitates distribution of log information (e.g., event log information characterizing events associated with operations of services, web applications, and so on) in a cross-enterprise file collaboration system.

The cross-enterprise collaboration system, e.g., as illustrated (as the system 10 in FIG. 1) in FIG. 1 includes one or more server computers (servers that include physical computers or are otherwise implemented via one or more virtual machines) coupled to one or more client devices. The one or more client devices include a first group of client devices on a first network and a second group of client devices on a second network.

The second example method 340 includes an initial receiving step 342, which involves receiving log information from a service that is in communication with a web application in response to an operation of a client device.

Next, a storing step 344 includes storing log information in a message broker, e.g., in a queue of a message broker, such as an Akka message broker.

Subsequently, a replicating step 346 includes using a replicator to fetch at least a portion of the log information from the message broker.

Lastly, a committing step 348 includes using a committer to write at least a portion of the fetched log information to a target, wherein the log information written to the target is also replicated across two or more data centers.

Note that the method 340 may be modified or replaced, without departing from the scope of the present teachings. For example, the method 340 may be modified to specify a method retrieving and selectively delivering data in a networked computing environment, wherein the method includes receiving a data stream; determining a processing task (e.g., writing data to an Elastic Search database or application); employing a distributed application (e.g., data transfer framework and accompanying replicators, fetchers, committer managers, and committer plugins) to selectively distribute data from the data stream to one or more components of the distributed application in accordance with a processing task; and using one or more of the components to write data to a target network resource.

The second example method 340 may be further modified to specify that the processing task includes modifying the data from the data stream and writing resulting modified data to the target network resource, wherein the target network resource includes a database.

The one or more components may include two or more components, wherein each of the two or more components is located on different intercommunicating servers. The processing task may include plural concurrent sub-tasks, wherein performance of the concurrent sub-tasks may take place on different network computing nodes and/or servers.

The one or more components may include a distributed service that is distributed across two or more servers of a server cluster included in the network computing environment (also called networked computing environment). The network computing environment may include or represent an enterprise computing environment with plural clusters, each of the plural clusters including one or more instances of the distributed service.

The distributed service may include a distributed ZK service that includes functionality that is replicated on two or more servers of the enterprise computing environment.

Determination of a processing task may include using one or more replicators to reference a task list maintained via the ZK service. The one or more replicators include two or more replicators distributed among the server cluster. The two or more replicators include a leader replicator. The two or more replicators may control one or more fetchers (e.g., by controlling starts and stops thereof and/or communications between the fetchers and other distributed components of a data transfer framework framework).

The second example method 340 may further include using the one or more fetchers to control one or more committer managers, and using the one or more fetchers selectively cache data from the message broker data stream for use by one or more committer managers.

The second example method 340 may further include caching a portion of a message broker data stream, wherein the portion is defined by a group of one or more messages specified by one or more respective message offsets whose values lie within a predetermined range of offset values.

The second example method 340 may further include using one or more custom plugins to one or more committer managers to apply a custom function to data retrieved from the message broker data stream to apply a process to retrieved data and then to write processed data to the target network resource. An example of a custom function may be software written by a user or customer that includes computer code for formatting data from a message broker stream, i.e., output by the message broker, into a specific format for a specific type of target database, application, and/or process.

Figure 11:
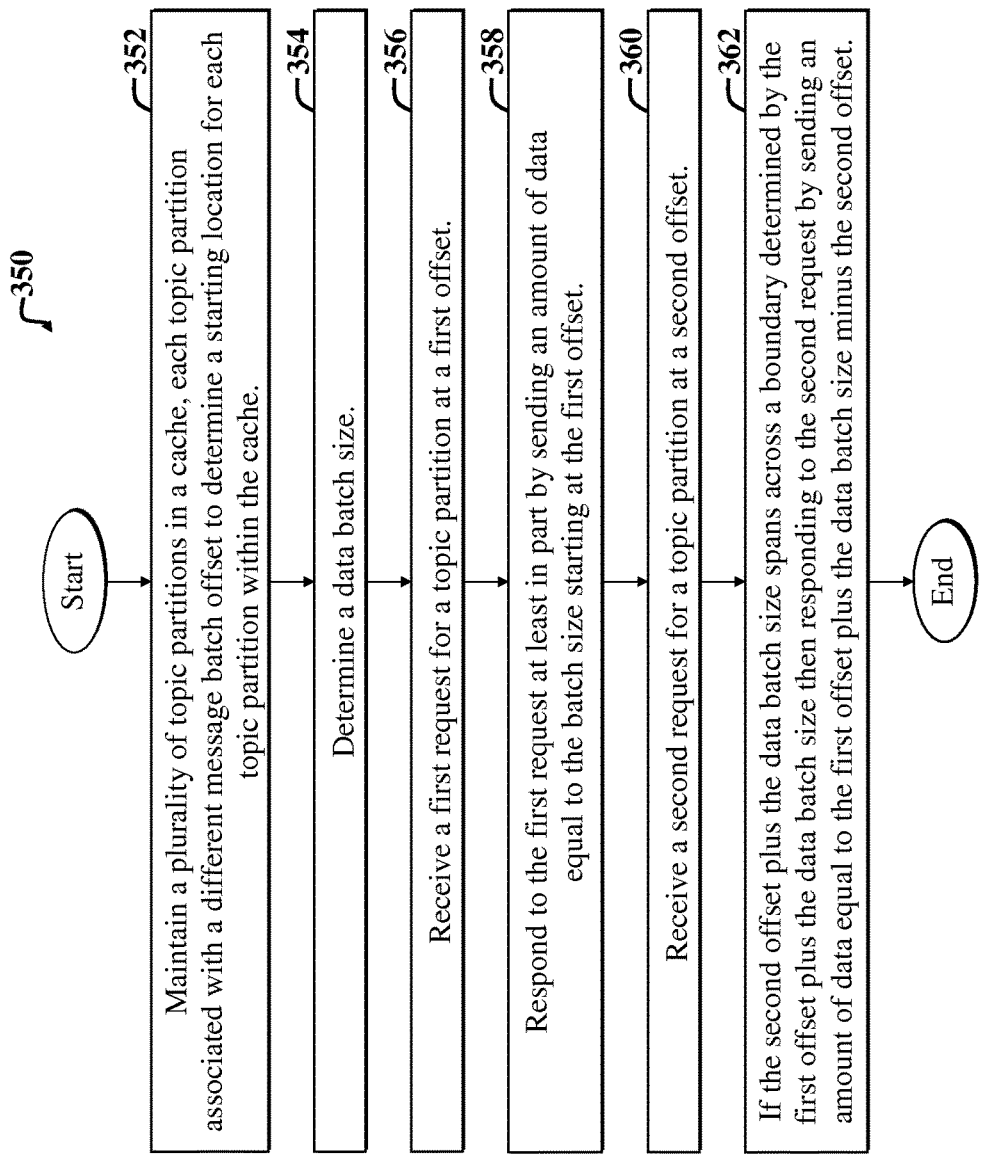
FIG. 11 is a flow diagram of a third example method implementable via the embodiments of FIGS. 1-6.

FIG. 11 is a flow diagram of a third example method 350 implementable via the embodiments of FIGS. 1-6. The third example method facilitates maintaining alignment of the message broker message data in a cache, wherein the cache facilitates distribution of log information in a cross-enterprise file collaboration system. The third example method 350 may be performed by one or more server computers and includes a first step 352, which involves maintaining a plurality of topic partitions in the cache, each topic partition associated with a different offset to determine a starting location for each topic partition within the cache.

A second step 354 includes determining a data batch size.

A third step 356 includes receiving a first request for a topic partition at a first offset.

A fourth step 358 includes responding to the first request at least in part by sending an amount of data equal to the batch size starting at the first offset.

A fifth step 360 includes receiving a second request for a topic partition at a second offset.

A sixth step 362 includes determining if the second offset plus the data batch size spans across a boundary determined by the first offset plus the data batch size, and if so, then responding to the second request by sending an amount of data equal to the first offset plus the data batch size minus the second offset.

The cache may implement a circular queue. Requests for topic partitions may be made using actors, such as committers and accompanying replicators.

The third example method 350 may be modified without departing from the scope of the present teachings. For example, the method 350 may be modified to specify a method for selectively caching data from a data stream, wherein the method includes receiving a message from the message stream, the message including an offset value; checking the offset with reference to a map of offsets; determining if the offset value of the message matches a key in the map of offsets; transferring the message to a committer in preparation for delivering the message or processed version thereof to a target network resource, when the offset value of the message matches the key; ascertaining if the offset value is within a range of a minimum and a maximum offset value; caching the message in a cache when the offset value does not match a key in the map of offsets and when the offset value is within the range; and updating the range based on the offset value when the message is cached.

Hence, the method 350 may further include, upon startup of the one or more committers, delivering complete message batches from a cache if the message batches are characterized by batch offsets maintained in the cache, and delivering portions of message batches from the cache if offsets of the message batches do not represent message batch offsets in cache, but do represent offsets of one or more messages stored in the cache.

The third example method 350 may further include a step specifying using a fetcher to receive the message from the message stream, wherein the message includes a message in a message stream output by the message broker, whereby the message stream represents a Kafka message stream.

The third example method 350 may further include using the committer manager to provide a request for the message from the message stream, wherein the request identifies the offset value of the message that is requested. The committer manager may further include plural committer managers for each fetcher. Each fetcher may be governed by a replicator that communicates with a ZK service, in part via a replicator leader that includes or represents a parent of a message broker monitor (e.g., Kafka monitor).

The third example method 350 may further include determining when the request that does not match a key corresponding to one or more messages stored in a cache, and then when the request does not match the key, checking if the offset value of the message falls with the range of the minimum and maximum offset values. If the offset value falls within the range, messages in the cache are selectively processed to determine if one or more of the messages in the cache include the offset of the message that is requested by the committer manager (where) the offset of the message that is requested represents a requested offset.

The third example 350 may further include determining if one or more of the messages in cache include the offset; then selectively retrieving the one or more messages characterized by the offset, and delivering the one or more messages to the committer. A last offset of a message in a batch of messages stored in the cache will initially be similar for all committers that request one or more messages from the cache during initial startup of plural committers that may access the cache as children of a parent fetcher node.

Although the description has been described with respect to particular embodiments thereof, these particular embodiments are merely illustrative, and not restrictive. For example, while various embodiments pertain to facilitating selectively transferring log data from a message stream or queue from a message broker operating in an enterprise computing environment, embodiments are not limited thereto. For example, environments other than enterprise computing environments (e.g., computing environments used by universities, governments, militaries, and so on) may leverage data transfer framework functionality discussed herein to facilitate interception and use of data from a message broker.

Furthermore, embodiments are not limited to processing log data or the delivering of log data to a target database. Transformed or modified data or signals triggered thereby may feed processes or applications, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for distributing log information in a cross-enterprise file collaboration system, the system including one or more server computers coupled to one or more client devices, wherein the one or more client devices include a first group of client devices on a first network and a second group of client devices on a second network, the method comprising the following performed by the one or more server computers:
   receiving log information from a service that is in communication with a web application in response to an operation of a client device;
   storing log information in a message broker;
   using a replicator of the one or more server computers to fetch at least a portion of the log information from the message broker, resulting in fetched log information in response thereto, wherein fetching the at least a portion of the log information comprises:
      using a replicator worker in communication with one or more fetchers to receive a portion of a message stream from the message broker, the one or more fetchers in communication with one or more committers, the replication worker comprising one of a plurality of replication workers for the replicator of the one or more servers, wherein the replication worker retrieves batches of data from the message broker and performs task assignments received from the replicator,
      using the one or more fetchers to selectively cache date from the message broker and share the cached data among one or more committers, each of the one or more fetchers comprising a child node of the replication worker, wherein each fetcher monitors and handles a predefined partition of a message topic of a plurality of message topics for the log information, and
      using the one or more committers to write at least a portion of the fetched log information to one or more targets, each of the one or more committers comprising a child node of at least one of the one or more fetchers, wherein each committer replicates data from the message broker to one or more targets for the committer and performs, by execution of a custom code plug-in, one or more overhead functions for the one or more targets of the committer, and wherein the log information written to the one or more targets is also replicated across two or more data centers by the one or more committers.

2. The method of claim 1, further including:
   using a distributed software framework to encapsulate overhead functionality for facilitating extracting data from a data stream output from the message broker and writing associated data to one or more targets in a networked computing environment,
   and wherein the overhead functionality includes functionality for providing one or more of (i) process redundancy and redistribution of work when a process becomes unreliable (ii) tracking of offsets for message batches in the data stream, (iii) automatically assigning work to nodes in the networked computing environment.

3. The method of claim 1, further including:
   employing the one or more committers to implement a software action using the portion of the message stream.

4. The method of claim 3, wherein the action includes writing the portion of the message stream to a target computing resource.

5. The method of claim 4, wherein the target computing resource includes a database or a computing process.

6. The method of claim 1, wherein the message broker includes a message broker for handling real-time data feeds.

7. The method of claim 3, further including:
selectively incorporating custom code as a plugin, wherein the custom code includes code to transform data of the message stream in advance of facilitating writing resulting transformed data to the target network resource.

8. The method of claim 7, wherein the portion of the message stream includes a sequence of messages, the sequence characterized by a specified length representing a number of messages in the sequence of messages.

9. The method of claim 3, further including:
employing a coordinator service to coordinate communications between operations of a cluster of servers, wherein the coordinator service includes one or more components that are replicated across each of the servers of the cluster of servers.

10. The method of claim 9, further including:
employing a toolkit to facilitate orchestrating data flow between software components within an individual server of the cluster of servers.

11. The method of claim 10, further including:
incorporating plural replicator workers, at least one replicator worker for two or more servers of the cluster of servers, to facilitate implementing a task indicated via the coordinator service.

12. The method of claim 11, further including:
employing a replicator leader to selectively rebalance portions of the task among the replicator workers, wherein the replicator leader includes a message broker monitor that monitors the message stream output by the message broker and selectively informs one or more replicator workers as to changes occurring in the message stream.

13. An apparatus for distributing log information in a cross-enterprise file collaboration system, the system including one or more server computers coupled to one or more client devices, wherein the client devices include a first group of client devices on a first network and a second group of client devices on a second network, the apparatus comprising:
a digital processor coupled to a display and to a non-transitory processor-readable storage device, wherein the non-transitory processor-readable storage device includes one or more instructions executable by the digital processor to perform the following acts:
receiving log information from a service that is in communication with a web application in response to an operation of a client device;
storing log information in a message broker;
using a replicator of the one or more server computers to fetch at least a portion of the log information from the message broker, resulting in fetched log information in response thereto, wherein fetching the at least a portion of the log information comprises:
using a replicator worker in communication with one or more fetchers to receive a portion of a message stream from the message broker, the one or more fetchers in communication with one or more committers, the replication worker comprising one of a plurality of replication workers for the replicator of the one or more servers, wherein the replication worker retrieves batches of data from the message broker and performs task assignments received from the replicator,
using the one or more fetchers to selectively cache date from the message broker and share the cached data among one or more committers, each of the one or more fetchers comprising a child node of the replication worker, wherein each fetcher monitors and handles a predefined partition of a message topic of a plurality of message topics for the log information, and
using the one or more committers to write at least a portion of the fetched log information to one or more targets, each of the one or more committers comprising a child node of at least one of the one or more fetchers, wherein each committer replicates data from the message broker to one or more targets for the committer and performs, by execution of a custom code plug-in, one or more overhead functions for the one or more targets of the committer, and wherein the log information written to the one or more targets is also replicated across two or more data centers by the one or more committers.

14. The apparatus of claim 13, wherein the non-transitory processor-readable storage device further includes one or more instructions executable by the digital processor to perform the following acts:
using a distributed software framework to encapsulate overhead functionality for facilitating extracting data from a data stream output from the message broker and writing associated data to one or more targets in a networked computing environment
and wherein the overhead functionality includes functionality for providing one or more of (i) process redundancy and redistribution of work when a process becomes unreliable (ii) tracking of offsets for message batches in the data stream, (iii) automatically assigning work to nodes in the networked computing environment.

15. The apparatus of claim 13, wherein the non-transitory processor-readable storage device further includes one or more instructions executable by the digital processor to perform the following acts:
employing the one or more committers to implement a software action using the portion of the message stream.

16. The apparatus of claim 15, wherein the action includes writing the portion of the message stream to a target computing resource.

17. A non-transitory processor-readable storage device including instructions executable by a digital processor, the processor-readable storage device including one or more instructions for:
receiving log information from a service that is in communication with a web application in response to an operation of a client device;
storing log information in a message broker;
using a replicator of the one or more server computers to fetch at least a portion of the log information from the message broker, resulting in fetched log information in response thereto, wherein fetching the at least a portion of the log information comprises:
using a replicator worker in communication with one or more fetchers to receive a portion of a message stream from the message broker, the one or more fetchers in communication with one or more committers, the replication worker comprising one of a plurality of replication workers for the replicator of the one or more servers, wherein the replication worker retrieves batches of data from the message broker and performs task assignments received from the replicator, using the one or more fetchers to selectively cache date from the message broker and share the cached data among one or more committers, each of the one or more fetchers comprising a child node of the replication worker, wherein each fetcher monitors and handles a predefined partition of a message topic of a plurality of message topics for the log information, and using the one or more committers to write at least a portion of the fetched log information to one or more targets, each of the one or more committers comprising a child node of at least one of the one or more fetchers, wherein each committer replicates data from the message broker to one or more targets for the committer and performs, by execution of a custom code plug-in, one or more overhead functions for the one or more targets of the committer, and wherein the log information written to the one or more targets is also replicated across two or more data centers by the one or more committers.

18. The non-transitory processor-readable storage device of claim 17, further includes one or more instructions executable by the digital processor for:

using a distributed software framework to encapsulate overhead functionality for facilitating extracting data from a data stream output from the message broker and writing associated data to one or more targets in a networked computing environment and wherein the overhead functionality includes functionality for providing one or more of (i) process redundancy and redistribution of work when a process becomes unreliable (ii) tracking of offsets for message batches in the data stream, (iii) automatically assigning work to nodes in the networked computing environment.

19. The non-transitory processor-readable storage device of claim 17, further includes one or more instructions executable by the digital processor for:

employing the one or more committers to implement a software action using the portion of the message stream.

20. The non-transitory processor-readable storage device of claim 19, wherein the action includes writing the portion of the message stream to a target computing resource.

* * * * *